United States Patent
Yamazaki et al.

(10) Patent No.: US 7,042,162 B2
(45) Date of Patent: May 9, 2006

(54) LIGHT EMITTING DEVICE

(75) Inventors: Shunpei Yamazaki, Setagaya (JP); Satoshi Seo, Kawasaki (JP); Hajime Kimura, Atsugi (JP); Yu Yamazaki, Setagaya (JP); Ryota Fukumoto, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 163 days.

(21) Appl. No.: 10/374,900

(22) Filed: Feb. 27, 2003

(65) Prior Publication Data

US 2003/0214245 A1 Nov. 20, 2003

(51) Int. Cl.
G09G 3/10 (2006.01)

(52) U.S. Cl. ................. 315/169.1; 315/169.3; 345/76; 345/82

(58) Field of Classification Search ........... 315/169.1, 315/169.3; 345/76, 82
See application file for complete search history.

(56) References Cited

U.S. PATENT DOCUMENTS

| | | | |
|---|---|---|---|
| 5,552,678 | A | 9/1996 | Tang et al. |
| 6,175,345 | B1 | 1/2001 | Kuribayashi et al. |
| 6,373,455 | B1 | 4/2002 | Kuribayashi et al. |
| 6,380,689 | B1 | 4/2002 | Okuda |
| 6,486,606 | B1 * | 11/2002 | Ting .................. 315/169.1 |
| 6,548,960 | B1 | 4/2003 | Inukai |
| 6,690,034 | B1 | 2/2004 | Fujimoto et al. |
| 6,693,388 | B1 * | 2/2004 | Oomura ............... 315/169.3 |
| 6,756,740 | B1 | 6/2004 | Inukai |
| 6,791,129 | B1 | 9/2004 | Inukai |
| 2001/0035849 | A1 | 11/2001 | Kimura |
| 2002/0000576 | A1 | 1/2002 | Inukai |
| 2002/0042152 | A1 | 4/2002 | Yamazaki et al. |
| 2003/0062545 | A1 | 4/2003 | Yamazaki et al. |
| 2003/0160745 | A1 | 8/2003 | Osame et al. |
| 2003/0174106 | A1 | 9/2003 | Tanada et al. |
| 2003/0209989 | A1 | 11/2003 | Anzai et al. |

FOREIGN PATENT DOCUMENTS

| | | |
|---|---|---|
| EP | 1 063 630 A2 | 12/2000 |
| EP | 1 103 946 | 5/2001 |
| JP | 08-180972 | 7/1996 |
| JP | 2001-5426 | 1/2001 |
| JP | 2001-109432 | 4/2001 |
| JP | 2001-142413 | 5/2001 |
| JP | 2001-222255 | 8/2001 |
| JP | 2001-343933 | 12/2001 |

OTHER PUBLICATIONS

US 6,762,736, 7/2004, Koyama (withdrawn)

* cited by examiner

*Primary Examiner*—David Vu
(74) *Attorney, Agent, or Firm*—Eric J. Robinson; Robinson Intellectual Property Law Office, P.C.

(57) ABSTRACT

The light-emitting element has a problem that reliability, heat-resisting stability and durability are low because of the deterioration in an organic compound layer. The TFT for driving the light-emitting element has a problem that variation readily occurs in its electrical characteristic due to the defects existing in grain boundaries. The present invention provides a light-emitting device by using the fact that, by applying to the light-emitting element a drive voltage having a polarity reverse to that in light emission during each constant period, the light-emitting element is improved in current-voltage characteristic. Furthermore, the present invention provides a light-emitting device made not dependent upon transistor characteristic, by controlling the amount of a current flowing through the light-emitting element.

14 Claims, 21 Drawing Sheets

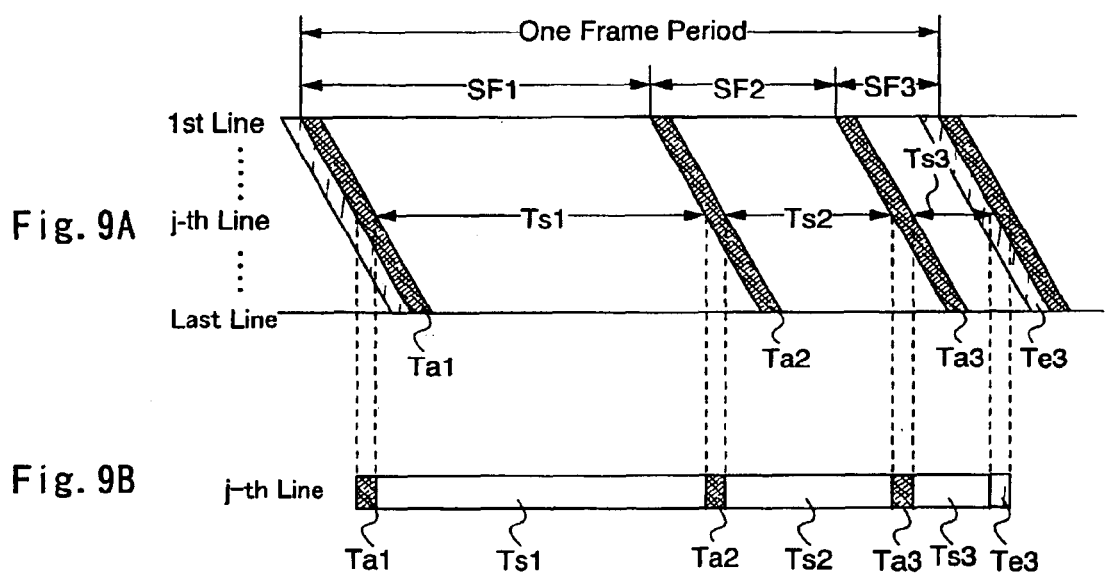

LIGHT EMITTING DEVICE

BACKGROUND OF THE INVENTION

1. Field of the Invention

The present invention relates to a technique of a light emitting device, more specifically, the invention relates to a light emitting device and a driving method therefor.

2. Description of the Related Art

Recently, display devices for performing image display are being developed. Liquid crystal display devices that perform image display by using a liquid crystal element are widely used as display panels for mobile phones and display devices for personal computers because of advantages of high image quality, thinness, lightweight, and the like.

In addition, light emitting devices using self-light emitting elements as light emitting elements are recently being developed. The light emitting device has characteristics of, in addition to advantages of existing liquid crystal display devices, for example, a high response speed suitable for dynamic image display, a low voltage, and low power consumption. Therefore, the light emitting device is expected to have a wide range of applications including new generation's mobile phone and personal digital assistance (PDA), thereby attracting a great deal of attention as the next generation display device.

The light emitting element is also called organic light emitting diode (OLED), and has a structure of an anode, a cathode, and an organic compound layer between the anode and the cathode. The current flowing to the light emitting element is in directly proportional to the luminance of the light emitting element, the light emitting element emits light corresponding to the amount of the current flowing to the organic compound layer.

A time-gray-scale scheme is adopted for the light emitting device (For example, refer to Patent Document 1). Further, a method of applying reverse biases to the light emitting element also can be adopted (For example, refer to Patent Document 2).

[Patent Document 1]
  JP 2001-5426
[Patent Document 2]
  JP 2001-142413

However, the light-emitting element is not resistive to the moisture or oxygen in air, thus involving a problem of low reliability, heat-resisting stability, durability and the like due to the deterioration in an organic compound layer. For this reason, there is a proposal that a light emitting element is to be applied by a drive voltage having a polarity reverse to that upon light emission (reverse bias voltage) during each of constant time periods. This is because the light emitting element is improved against the deterioration in current-voltage characteristic by applying such a reverse polarity of drive voltage to the light emitting element.

In order to apply a reverse polarity of drive voltage to the light emitting element, there is a need to change the potential at between the first and second electrodes of the light emitting element. The simplest way for changing the potential at between the first and second electrodes is to change a counter potential of the light emitting element. However, the counter potential of a light emitting element, in many cases, is connected to a line common to all the pixels, making it impossible to change the counter potential pixel by pixel or line by line. Namely, to change the counter potential of a light emitting element, there is no way but to carry out at one time on all the pixels. Thus, there is a difficulty in changing the timing of the counter potential. Accordingly, in case a reverse bias is to be applied by changing the counter potential of the light emitting element, there encounters an influence upon gray scale representation.

Meanwhile, there are various schemes of drive methods to display multi-gray-scale image on a light-emitting device using light-emitting elements, one of which is a voltage-input scheme. The voltage-input scheme means a scheme that a video signal, for input to the pixel, is inputted to a gate electrode of a drive element thereby controlling the brightness on the light-emitting element through the use of that drive element.

However, in the case of the voltage input scheme, the semiconductor element for driving the light-emitting elements is formed of polycrystal semiconductor (polysilicon) having a high on-current. However, the polysilicon transistor formed of polysilicon involves a problem that its electrical characteristic readily varies due to the defects in grain boundaries. In case there is variation in characteristics, such as threshold or on-current, pixel by pixel on the transistors configuring the pixels, even when inputting the same video signal, the drain current though the transistor is different correspondingly thus resulting in brightness variation between the light-emitting elements. Furthermore, there occurs unevenness in the emission-light brightness on the pixels of the screen, resulting in blurs.

Accordingly, it is a subject of the present invention to provide a light-emitting device which is to be applied by a current input scheme capable of controlling the magnitude of a current flowing through the light-emitting element not dependent upon characteristics of the transistors configuring the pixels.

Also, it is a subject to provide a light-emitting device that a reverse bias is applied to the light-emitting elements freely from the influence upon gray scale representation thereby improving against the deterioration in current-voltage characteristics.

SUMMARY OF THE INVENTION

The present invention arranges newly a semiconductor element in order to apply a reverse bias voltage (reverse bias) to a light-emitting element. The semiconductor element corresponds to a transistor or diode. By using the newly arranged semiconductor element, it is made possible to apply a reverse bias on the basis of arbitrary pixels, i.e. pixel by pixel or line by line.

More specifically, simultaneously with a conduction state of the semiconductor element, a reverse bias is applied to the light-emitting element. Namely, when the semiconductor element is put in a conduction state, an electrical connection state is provided between a certain line and the light-emitting element. In this case, by making a potential on the certain line lower than the counter potential on the light-emitting element, a reverse bias is applied to the light-emitting element simultaneously with turning the semiconductor element to a conduction state.

Although the application of a reverse bias naturally places the light-emitting element out of light emission, the invention having the above configuration can apply a reverse bias in arbitrary timing to arbitrary pixels without the need to apply a reverse bias simultaneously to every pixel, thus having no effect upon gray scale representation.

Also, the invention provides a light-emitting device which is made not dependent upon transistor characteristic by controlling the amount of a current flowing through the light-emitting element. More specifically, a current source is arranged within the pixel, to supply a signal current supplied from the current source to the light-emitting element. This makes it possible to supply a constant value of signal current to the light-emitting element freely from the characteristic variation between the transistors configuring the pixel.

Incidentally, the current source includes at least one transistor and a capacitance element for holding a gate-to-source voltage of the transistor. The current source supplies a predetermined signal current without undergoing the influence of characteristic variation between the transistors. Because the brightness on the light-emitting element is proportional to a current flowing between the both electrodes, especially effective is the configuration of the invention that a predetermined signal current is supplied by using a current source to obtain a desired brightness from the light-emitting element.

Meanwhile, it is the conventional practice to determine the amount of a current flowing through the light-emitting element by inputting a video signal voltage to a transistor gate electrode. However, the invention uses a video signal, for input to the pixel, only in selecting a case to flow a current to the light-emitting element and a case not to flow a current. As a result, it is possible to suppress against the influence of characteristic variation between the transistors configuring the pixel.

A concrete configuration of a light-emitting device of the invention comprises:

first setting means for setting a plurality of sub-frame periods within a unit frame period corresponding to a synchronization timing of an inputted video signal;

capacitance means for holding the video signal;

drive means for supplying a predetermined signal current supplied from the current source to the light-emitting element according to the video signal, during each of the sub-frame periods;

erasing means for causing each of the light-emitting elements to cease light emission when a light emission period of each of the light-emitting elements reaches a predetermined light-emitting period with respect to a predetermined period of the frame period; and second setting means for supplying a reverse bias voltage to the light-emitting element while maintaining a potential on the first or second electrode, during the predetermined period of the frame period.

Incidentally, the first setting means corresponds to a select transistor to control an input of a video signal to the pixel. Also, the first setting means corresponds to a drive circuit for driving the pixel, a control circuit or the like. Furthermore, the drive means corresponds to a drive transistor of the pixel. The drive transistor refers to a transistor, in many cases, having a source or drain terminal thereof directly connected to a first or second electrode of the light-emitting element. Meanwhile, the erasing means has a function to cease light emission of the light-emitting element, which concretely corresponds to an erasing transistor. In order to cause the light-emitting element to cease light emission, the capacitance element holding the video signal is released of charge. Consequently, the erasing transistor, in many cases, has a source and a drain that are connected sandwiching both electrodes of the capacitance element. Meanwhile, the second setting means corresponds to a transistor that turns to a conduction state when a reverse bias is applied to the light-emitting element.

When the second setting means turns to a conduction state, the potential on one of the first and second electrodes of the light-emitting element is maintained as it is while the other electrode is connected to a reverse-bias line and changed in its potential. Thereupon, a reverse bias is applied to between the electrodes of the light-emitting element. Incidentally, the capacitance means, for holding a video signal, need not be explicitly provided. Provided that a sufficient capacitance is available, a parasitic capacitance or a drive-transistor gate capacitance may be used. Also, the drive transistor has a mere switching function. When the drive transistor turns to a conduction state, a predetermined signal current is supplied from the current source.

Herein, explanation is made on the outline of the pixel of the light-emitting device of the invention, by using FIGS. 1A and 1B. In FIG. 1A, there is shown a pixel 10 arranged on i-th column and j-th row in a pixel region having a plurality of pixels. The pixel 10 has a signal line ($S_i$), a power line ($V_i$), a first scanning line ($G_{aj}$), a second scanning line ($G_{bj}$), a select switch 11 having a switching function, an erase switch 12, a drive element 13, a discharge switch 14, a capacitance element 15, a light-emitting element 16 and a current source 17.

The select switch 11, the erase switch 12 and the discharge switch 14 preferably use one or a plurality of semiconductor elements having a switching function, such as transistors. The select switch 11 is determined on and off according to a signal provided from the first scanning line ($G_{aj}$) while the erase switch 12 is determined on and off according to a signal provided from the second scanning line ($G_{bj}$).

The discharge switch 14, at its gate electrode, is determined on or off according to a signal provided from a certain line. Meanwhile, the discharge switch 14, at its source electrode, is connected to a certain line. The concrete connection of the discharge switch 14 will be hereinafter described in the embodiments.

The capacitance element 15 holds a signal inputted to the pixel 10 through the signal line ($S_i$). The capacitance element 15 holds a gate-to-source voltage of the drive element 13.

The invention uses the discharge switch 14, to control the timing applying a reverse bias to the light-emitting element 16. More specifically, the discharge switch 14 is used for control to apply a reverse bias voltage during a period the light-emitting element 16 is out of light emission. Furthermore, the invention provides a current source 17 on the pixel 10, thereby enabling to flow a desired amount of current to the light-emitting element 16. The transistors configuring the pixel 10 can be suppressed against the influence of characteristic variation.

FIG. 1B shows a pixel 10 having a different configuration from the pixel 10 shown in FIG. 1A. The pixel 10 has a signal line ($S_i$), a power line ($V_i$), a first scanning line ($G_{aj}$), a second scanning line ($G_{bj}$), a select switch 21 having a switching function, an erase switch 22, a drive element 23, a discharge diode 24, a capacitance element 25, a light-emitting element 26 and a current source 27.

The select switch 21 and the erase switch 22 preferably use one or a plurality of semiconductor elements having a switching function, such as transistors. The select switch 21 is determined on and off according to a signal provided from the first scanning line ($G_{aj}$) while the erase switch 22 is determined on and off according to a signal provided from the second scanning line ($G_{bj}$).

The discharge diode 24, at its one terminal, is connected to a certain line. The concrete connection of the discharge diode 24 will be hereinafter described in the embodiments. Incidentally, the discharge diode 24 may use an element having a rectifying characteristic. For example, besides diode, there is included a transistor having gate and drain electrodes connected together. Note that, in this description, the transistor having gate and drain electrodes connected together is referred to as a diode-connection transistor.

The capacitance element 25 holds a signal inputted to the pixel 10 through the signal line ($S_i$). The capacitance element 25 holds a gate-to-source voltage of the drive element 23.

The invention uses the discharge diode 24, to control the timing applying a reverse bias to the light-emitting element 26. More specifically, the discharge diode 24 is used for control to apply a reverse bias voltage during a period the light-emitting element 26 is out of light emission. Furthermore, the invention provides a current source 27 on the pixel 10, thereby enabling to flow a desired amount of current to the light-emitting element 26. The transistors configuring the pixel 10 can be suppressed against the influence of characteristic variation.

Meanwhile, in the case that the light-emitting-device driving scheme adopts a time-gray-scale scheme, a reverse bias is applied during a period the light-emitting element is out of light emission thereby making it possible to apply a reverse bias without affecting gray scale representation.

BRIEF DESCRIPTION OF THE DRAWINGS

FIGS. 9A–9B are diagrams explaining a drive method for the light-emitting device of the invention;

DESCRIPTION OF THE PREFERRED EMBODIMENTS

[Embodiment 1]

Figure 1A:
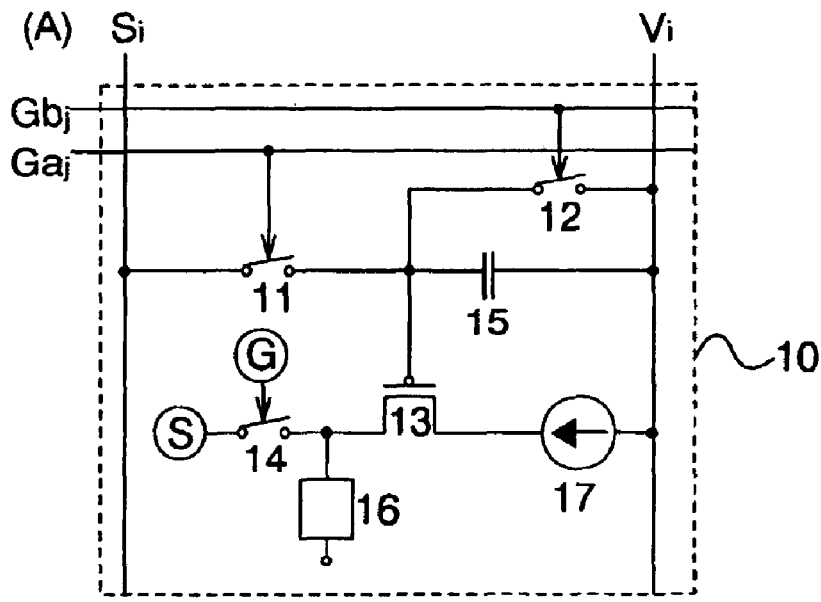
FIGS. 1A and 1B are diagrams showing a pixel of a light-emitting device of the present invention.
Figure 1B:
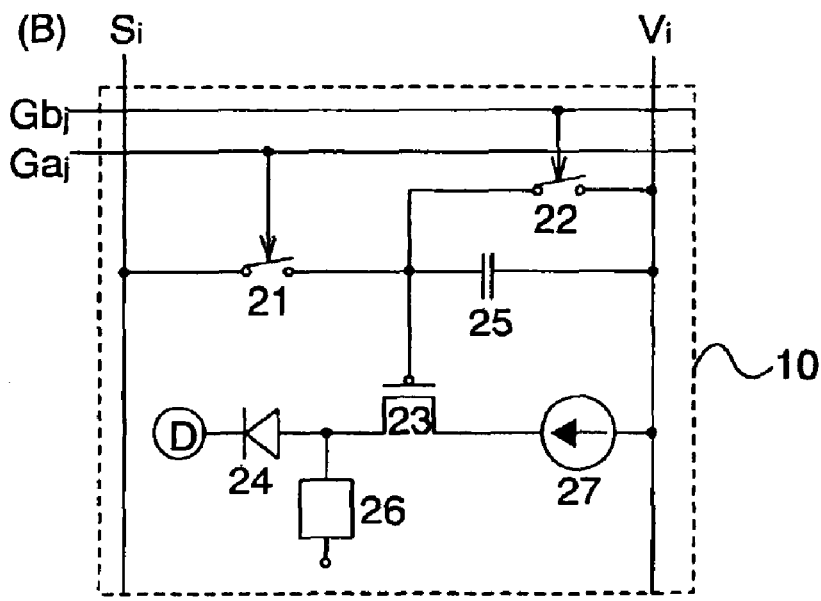

Although the pixel of the light-emitting device of the present invention was outlined two kinds by using FIGS. 1A and 1B, this embodiment explains a detailed configuration example and operation of the pixel of FIG. 1A by using FIGS. 2A to 2C, 4A and 4B. Specifically, explanation is made on a case that devising is made for a connection of the gate electrode of the discharge transistor 14 configuring for the pixel 10 shown in FIG. 1A, by using FIGS. 2A to 2C, 4A and 4B. Furthermore, explanation is made on a layout of the pixel 10 shown in FIGS. 2A to 2C, by using FIGS. 3A and 3B.

Figure 2A:
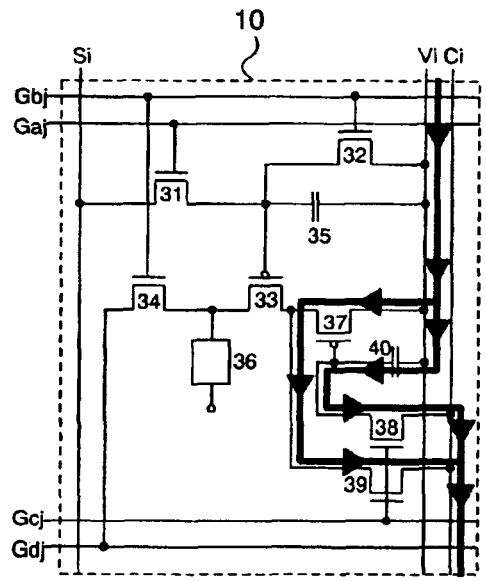
FIGS. 2A to 2C are diagrams showing a pixel of the light-emitting device of the present invention.

In FIG. 2A, the pixel 10 includes a select transistor 31, an erase transistor 32, a drive transistor 33, a discharge transistor 34, a capacitance element 35, a light-emitting element 36, a current-source transistor 37, a set transistor 38, a set transistor 39 and a capacitance element 40. Also, the pixel 10 has a first scanning line ($G_{aj}$)—a fourth scanning line ($G_{dj}$), a signal line ($S_i$), a power line ($V_i$) and a current line ($C_i$). In the periphery of the pixel 10, there are provided a scanning-line drive circuit, a signal-line drive circuit, a current line, a power line (none shown) and so on. A signal is inputted from the scanning-line drive circuit to the pixel 10 through the first scanning line ($G_{aj}$)—fourth scanning line ($G_{dj}$), while a signal is inputted from the signal-line drive circuit to the pixel 10 through the signal line ($S_i$).

The select transistor 31 and the capacitance element 35 are connected in series and arranged between the signal line ($S_i$) and the power line ($V_i$). The select transistor 31 has a gate electrode connected to the first scanning line ($G_{aj}$). Hereinafter, the select transistor 31 is denoted as a transistor 31. Meanwhile, the erase transistor 32 has a gate electrode connected to the second scanning line ($G_{bj}$), whose source and drain electrodes are connected together through both electrodes of the capacitance element 35. Hereinafter, the erase transistor 32 is denoted as a transistor 32. Note that the transistors 31, 32, functioning as mere switches, are not limited in their conductivity types. Nevertheless, because there is a case that the gate electrode of the transistor 32 and the gate electrode of the transistor 34 are connected to the same canning line, these transistors in such a case are preferably given the same conductivity type.

The discharge transistor 34, the drive transistor 33 and the current-source transistor 37 are connected in series and arranged between the power line ($V_i$) and the fourth scanning line ($G_{dj}$). The discharge transistor 34 has a gate electrode connected to the second scanning line ($G_{bj}$). The drive transistor 33 has a gate electrode connected to one terminal of the capacitance element 35 while the current-source transistor 37 has a gate electrode connected to one terminal of the capacitance element 40. Hereinafter, the discharge transistor 34 is denoted as a transistor 34, the drive transistor 33 as a transistor 33 and the current-source transistor 37 as a transistor 37.

The set transistor 38 and the set transistor 39 are common in their gate electrodes and connected to the third scanning line ($G_{cj}$). The set transistor 38 and the capacitance element 40 are connected in series and arranged between the current line ($C_i$) and the power line ($V_i$). The set transistor 39 and the current-source transistor 37 are connected in series and arranged between the current line ($C_i$) and the power line ($v_i$). Hereinafter, the set transistors 38, 39 are denoted as transistors 38, 39. Although the transistors 38, 39 are not limited in their conductivity types, both transistors are required in the same conductivity type because the same signal is to be inputted. Note that the transistors 37–39 and capacitance element 40 correspond to the current source 17 shown in FIG. 1A. Incidentally, in FIGS. 2A to 2C, the capacitance element 40 has one electrode connected to a gate of the transistor 37 and the other electrode connected to the power line ($V_i$). However, the other electrode of the capacitance element may be connected to a line having a constant potential, e.g. may be grounded.

Figure 2B:
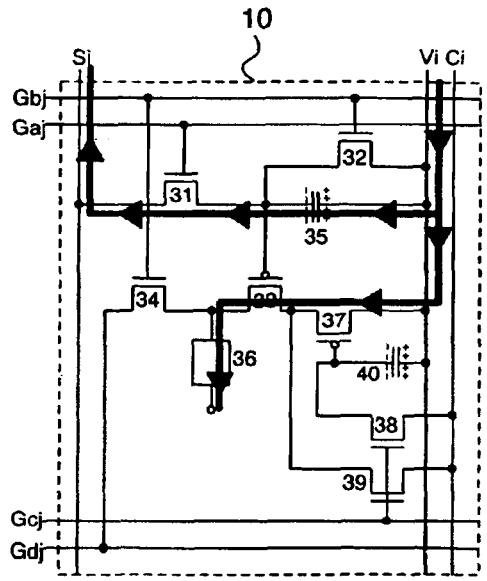
Figure 2C:
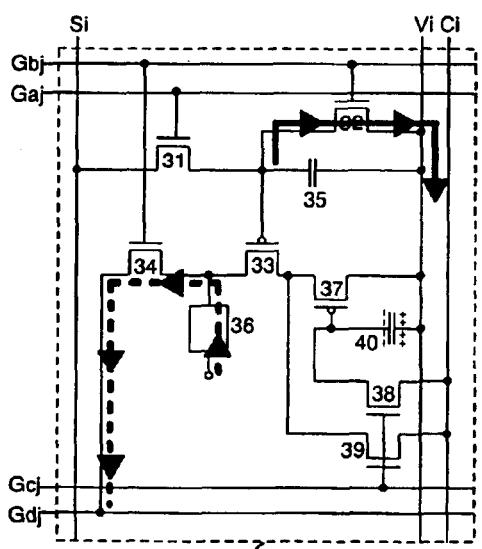

The operation of the pixel 10 is now explained by using FIGS. 2A to 2C.

This embodiment separately explains the operation of the pixel 10, i.e. the operation for setting the current source to flow a desired current (hereinafter, referred to as setting operation), the operation for causing the light-emitting element 36 to emit light (hereinafter, referred to as light-emitting operation), the operation for discharging the electric charge held on the capacitance element 35 (hereinafter, referred to as erasure operation) and the operation for applying a reverse bias to the light-emitting element 36 (hereinafter, referred to as reverse-bias applying operation). This embodiment explains the setting operation by using FIG. 2A, the light-emitting operation by using FIG. 2B, and the erasure and reverse-bias applying operations by using FIG. 2C.

First, explained is the operation for setting the current source to flow a desired current, by using FIG. 2A. In the beginning, by a signal inputted from the scanning-line drive circuit (not shown) provided in the periphery of the pixel 10 to a j-th row of third scanning line ($G_{cj}$), selected is the j-th row of third scanning line ($G_{cj}$). Thereupon, an H level signal is inputted from the third scanning line ($G_{cj}$) to the gate electrode of the transistor 38, 39. This turns on the n-channel transistor 38, 39. At this time, there is no signal input to the first scanning line ($G_{aj}$) and second scanning line ($G_{bj}$), and the other transistors than the transistors 38, 39 remain off.

In the instant the transistor 38, 39 turns on, no charge is yet held on the capacitance element 40 and hence the transistor 37 is off. At this time, a current is flowing from a power source (not shown) provided in the periphery of the pixel 10 toward the current line ($C_i$) through the power line ($v_i$) and through the capacitance element 40 and source-to-drain of the transistor 38.

Thereafter, charge gradually builds up on the capacitance element 40, and a potential difference begins to occur at between the both electrodes thereof. In case the potential difference between the both electrodes of the capacitance element 40 becomes a threshold voltage ($V_{th}$) or higher of the transistor 37, the transistor 37 turns on. Thereupon, a current flows from the power line ($V_i$) toward the current line ($C_i$) through the source-to-drain of the transistor 37, 39.

On the capacitance element 40, storage of charge continues until the potential difference on between the both electrodes thereof, i.e. the gate-to-source voltage of the transistor 37, reaches a desired voltage, i.e. until reaching a voltage ($V_{gs}$) that the transistor 37 can afford to flow a predetermined signal current $I_{data}$.

When the charge storage to the capacitance element 40 completes, the transistor 37 has a flowing current $I_{data}$ equal to the current flowing on the current line ($C_i$). If so, the signal write operation to the pixel 10 completes. Selection of the third scanning line ($G_{cj}$) ends to turn off the transistor 38, 39.

Next, the light-emitting operation of the light-emitting element 36 is entered (FIG. 2B). By a signal inputted from the scanning-line drive circuit (not shown) provided in the periphery of the pixel 11 to a j-th row of first scanning line ($G_{aj}$), selected is the j-th row of first scanning line ($G_{aj}$). An H-level signal is inputted from the first scanning line ($G_{aj}$) to the gate electrode of the transistor 31. Thereupon, the n-channel transistor 31 turns on. At this time, because no signal is inputted to the second scanning line ($G_{bj}$) and third scanning line ($G_{cj}$), the transistors other than the transistor 31 remain off. Simultaneously, a video signal is inputted from the signal-line drive circuit (not shown) provided in the periphery of the pixel 10 to the pixel 10 through the i-th row of signal line ($S_i$). The video signal is held on the capacitance element 35. When the potential difference at between the both electrodes of the capacitance element 35 becomes a threshold voltage ($V_{th}$) of transistor 33 or higher, the transistor 33 turns on.

At this time, because the capacitance element 40 holds the charge written as in the above, the transistor 37 is kept on. A current equal to the signal current $I_{data}$ flows from the power line ($V_i$) to the source-to-drain of the transistor 37 and source-to-drain of the transistor 33, finally reaching the light-emitting element 36. As a result, a signal current $I_{data}$, as a desired current, flows to the light-emitting element 36. Incidentally, in case the transistor 37 is provided to operate in a saturation region, the current can flow, without change, toward the light-emitting element 36 even if there is a change in the source-to-drain voltage of the transistor 37.

Subsequently, the erasure/reverse-bias-applying operation of the pixel 10 is entered (FIG. 2C). By a signal inputted from the scanning-line drive circuit (not shown) provided in the periphery of the pixel 10 to a j-th row of second scanning line ($G_{bj}$), selected is the j-th row of second scanning line ($G_{bj}$). An H level signal is inputted from the second scanning line ($G_{bj}$) to the gate electrode of the transistor. 32, 34, and the transistor 32, 34 turns on. At this time, because there is no signal input to the first scanning line ($G_{aj}$) and third scanning line ($G_{cj}$), the transistors other than the transistors 32, 34 remain off.

In case the transistor 32 turns on, the charge held on the capacitance element 35 is released to turn off the transistor 33. When the transistor 33 turns off, the current supply ceases from the power line ($V_i$) to the light-emitting element 36 so that the light-emitting element 36 ceases its light emission. At this time, because the potential on the fourth scanning line ($G_{dj}$) is lower than the potential on the counter electrode of the light-emitting element 36, a reverse bias can be applied to the light-emitting element 36. Incidentally, in FIG. 2C, there is shown an arrow in a direction of from the light-emitting element 36 to the fourth scanning line ($G_{dj}$) through the source-to-drain of the transistor 34. This is the showing with a dotted line in order for easier understanding of explanation though no current actually flows even if applying a reverse bias to the light-emitting element 36.

In this manner, the pixel 10 repeats the setting operation (FIG. 2A), the light-emitting operation of the light-emitting element 36 (FIG. 2B) and the erasure/reverse-bias-applying operation, due to the signals given from the drive circuit (not shown) provided in the periphery of the pixel 10.

Incidentally, in the case of digital drive, the charge held on the capacitance element 40 is always constant. Consequently, after a predetermined charge is once set to the capacitance element 40, there is no need to carry out a setting operation each time a video signal is inputted. Namely, after once carrying out a setting operation of among setting operation, light-emitting operation and erasure/reverse-bias-applying operation, setting operation may be omitted to repeat light-emitting operation and erasure/reverse-bias-applying operation. However, because the charge held on the capacitance element 40 possibly discharges with a lapse of time, it is necessary to carry out setting operation to the capacitance element 40 in such timing in preventing that.

Although the erasure operation and the reverse-bias applying operation are simultaneously made for the pixel 10 shown in FIGS. 2A to 2C, the invention is not limited to it, i.e. erasure operation and reverse-bias applying operation may be carried out separately. The reverse-bias applying operation may not be done each time a video signal is inputted, i.e. it may be at a certain constant interval.

Figure 4A:
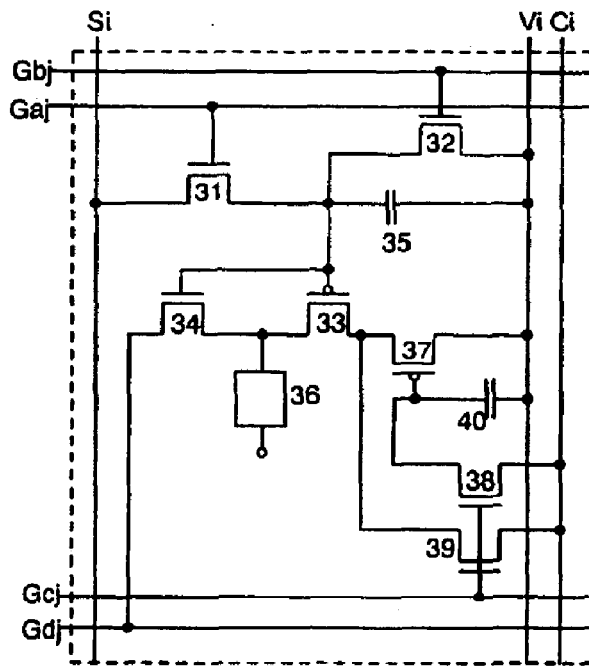
FIGS. 4A and 4B are diagrams showing a pixel of the light-emitting device of the present invention.

Meanwhile, the configuration of a connection of the transistor 34 configuring the pixel 10 is not limited to the configuration shown in FIGS. 2A to 2C. For example, as shown in FIG. 4A, the gate electrode of the transistor 34 may be connected to the gate electrode of the transistor 33. This makes it possible to simultaneously carry out an erasure operation and a reverse-bias applying operation for the pixel 10. In this case, however, the transistors 33, 34 require setting in different conductivity types from each other in order not to prevent these from turning on simultaneously. This is because, when the transistors 33, 34 turn on simultaneously, a current is supplied from the power line ($V_i$) to the light-emitting element 36 with a result that a reverse bias cannot be successfully applied to the light-emitting element 36.

Figure 4B:
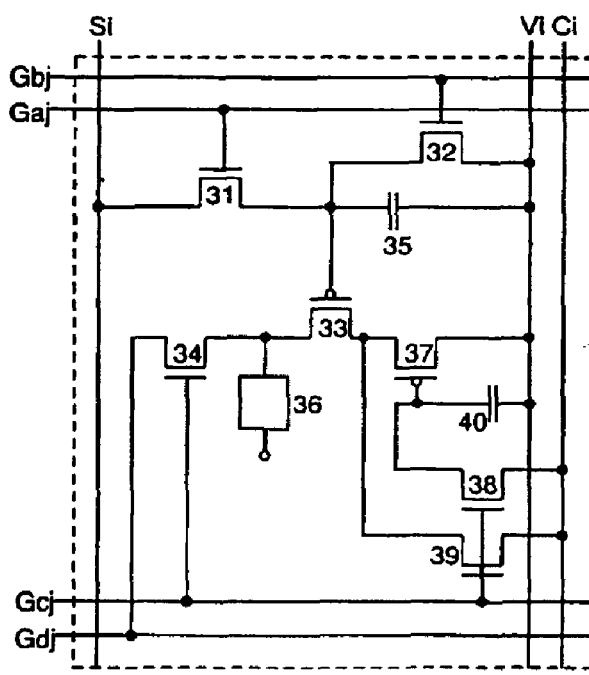
Figure 5A:
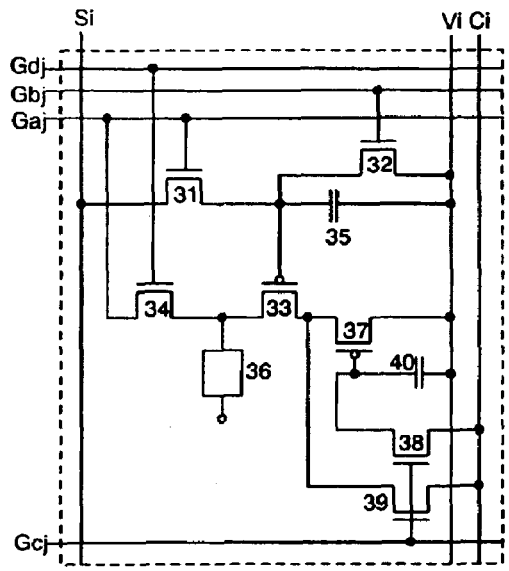
FIGS. 5A to 5D are diagrams showing a pixel of the light-emitting device of the present invention.
Figure 5B:
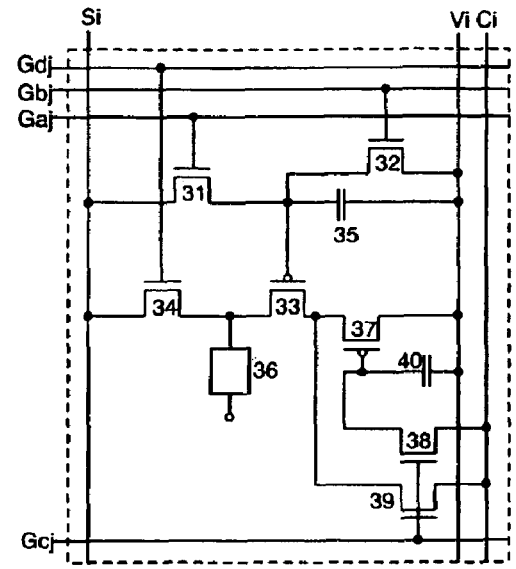
Figure 5C:
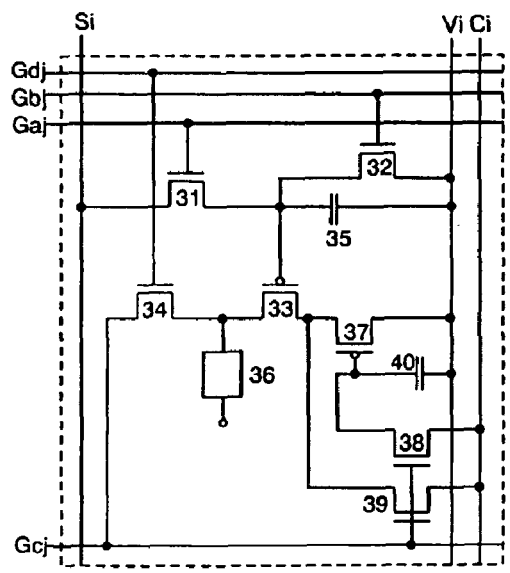
Figure 5D:
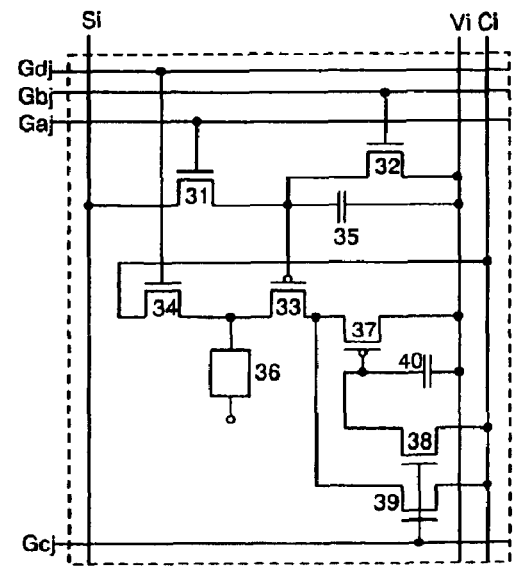

Meanwhile, as shown in FIG. 4B, the gate electrode of the transistor 34 may be connected to the third scanning line ($G_{cj}$) and the source electrode thereof to the fourth scanning line ($G_{dj}$). In this case, it is possible to simultaneously carry out the setting operation for the pixel 10 (corresponding to FIG. 2A) and the erasure and reverse-bias applying operations (corresponding to FIG. 2C). For this reason, the transistor 34 and the transistor 38, 39 require setting in the same conductivity type.

Incidentally, the operation of the pixel 10 shown in FIGS. 4A and 4B is similar to the operation of the pixel 10 explained using FIGS. 2A to 2C, and hence omittedly explained in this embodiment.

Subsequently, explanation is made on a layout example of the pixel 10 shown in FIGS. 2A to 2C by exemplifying the same using FIGS. 3A and 3B.

Figure 3A:
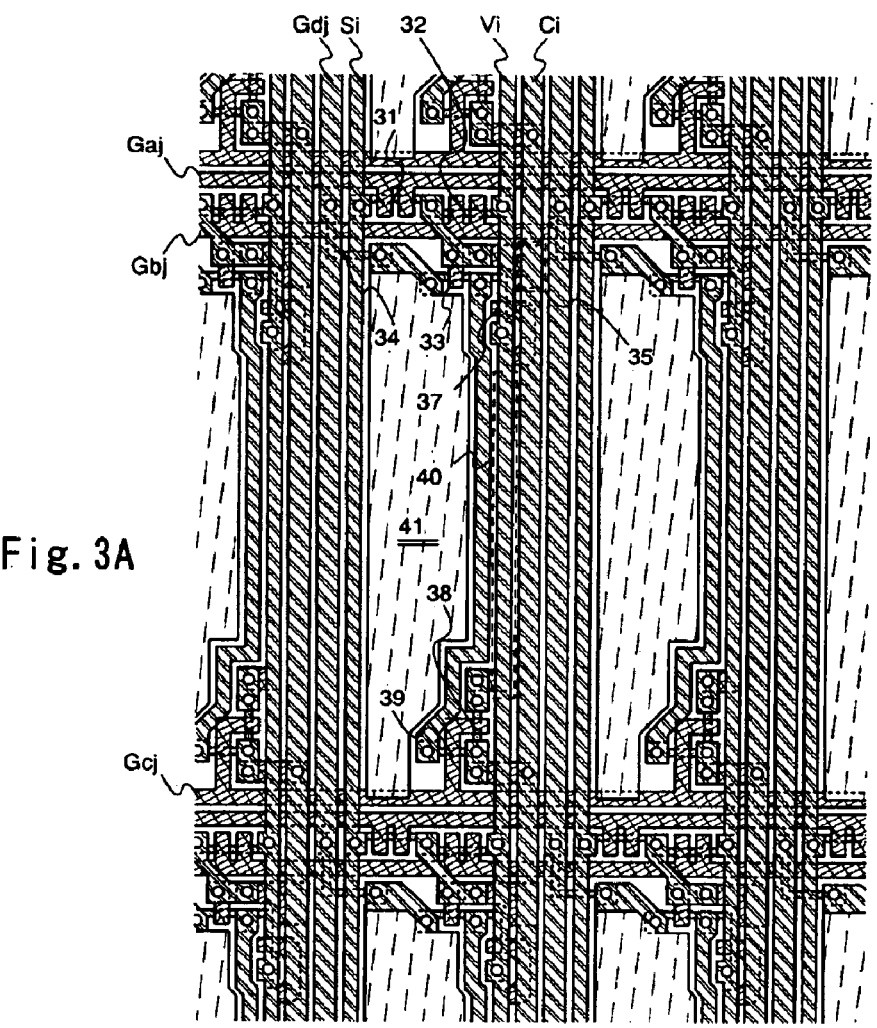
FIGS. 3A and 3B are layout views of the light-emitting device of the invention.

The references of the elements configuring the pixels 10 of FIGS. 2A to 2C and 3A are the same, which can be conveniently made reference to each other. In FIG. 3A, the pixel 10 has a select transistor 31, an erase transistor 32, a drive transistor 33, a discharge transistor 34, a capacitance element 35, a light-emitting element 36, a current-source transistor 37, a set transistor 38, a set transistor 39 and a capacitance element 40. Also, the pixel 10 has a first scanning line ($G_{aj}$)—a fourth scanning line ($G_{dj}$), a signal line ($S_i$), a power line ($V_i$) and a current line ($C_i$).

Figure 3B:
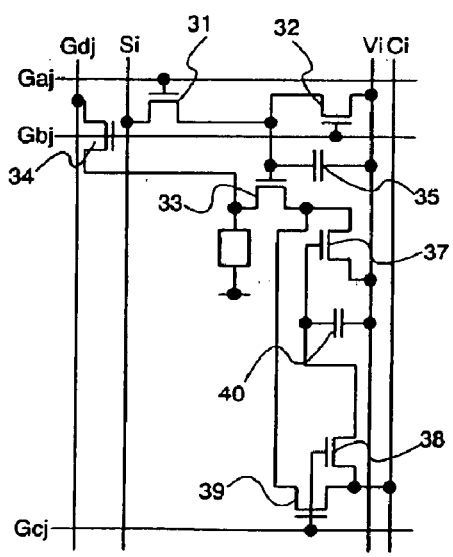

The pixel 10 laid out, if represented directly in a circuit diagram, can be shown as in FIG. 3B. As can be understood from FIG. 3B, the transistors 32, 34 are arranged in a linear form because they are connected to the same scanning line. 41 is a pixel electrode, which corresponds to an opening. The other transistors are arranged possibly right to the pixel 10, thereby enhancing the opening ratio and making the opening of the pixel 10 in a simple form.

[Embodiment 2]

Embodiment 1 explained the case that devising is made for the connection of the gate electrode of the discharge transistor 14 of FIG. 1A. This embodiment explains a case that devising is made for a connection of the source electrode of the discharge transistor 14 of FIG. 1A using FIGS. 5A to 5D.

The pixel 10 shown in FIG. 2A and the pixel 10 shown in FIGS. 5A to 5D are the same in the number of the elements configuring the pixel 10 and the connection relationship between the elements excepting the difference in connection of the discharge transistor 34 (hereinafter, denoted as a transistor 34), and hence detailed explanation is omitted in this embodiment.

In FIGS. 5A to 5D, the transistor 34 has a gate electrode connected to the fourth scanning line ($G_{dj}$). In the pixel 10 shown in FIG. 5A, the transistor 34 has a source electrode connected to the first scanning line ($G_{aj}$) while, in the pixel 10 shown in FIG. 5B, the transistor 34 has a source electrode connected to the signal line ($S_1$). In the pixel 10 shown in FIG. 5C, the transistor 34 has a source electrode connected to the third scanning line ($G_{cj}$) while, in the pixel 10 shown in FIG. 5D, the transistor 34 has a source electrode connected to the current line ($C_i$).

Incidentally, the connection of the transistor 34 configuring the pixel 10 is not limited to the connection shown in FIGS. 5A to 5D. The gate electrode of the transistor 34 may be connected to one of the first scanning line ($G_{aj}$)—third scanning line ($G_{cj}$) instead of the fourth scanning line ($G_{dj}$). Also, the source electrode of the transistor 34 may be connected to the second scanning line ($G_{bj}$). Furthermore, provided that the potential on the cathode of the light-emitting element 36 is varied, the source electrode of the transistor 34 may be connected to the power line ($V_i$).

The operation of the pixel 10 shown in FIGS. 5A to 5D is similar to the operation of the pixel 10 explained using FIGS. 2A to 2C, and is omitted in this embodiment.

Incidentally, in the pixel 10 shown in FIGS. 5A to 5D, the gate electrode of the transistor 34 is connected to the fourth scanning line ($G_{dj}$). Consequently, in case the scanning-line drive circuit is controlled, the transistor 34 is not inputted by a signal simultaneously with the other transistors. Thus, the operation of applying a reverse bias to the light-emitting element 36 can be done independently.

However, by making the same between the timing to give a signal to and turn on the transistor 38, 39 and timing to give a signal to and turn on the transistor 34, setting operation and reverse-bias-applying operation can be simultaneously done for the pixel 10. Also, by making the same between the timing to give a signal to and turn on the transistor 32 and timing to give a signal to and turn on the transistor 34, erasure operation and reverse-bias-applying operation can be simultaneously done for the pixel 10. At this time, the gate electrode of the transistor 34 may be connected to any one of the first scanning line ($G_{aj}$)—third scanning line ($G_{cj}$) instead of the fourth scanning line ($G_{dj}$). However, attention should be paid not to connect the gate electrode and the source region of the transistor 34 to the same line.

Incidentally, this embodiment can be desirably combined with Embodiment 1.

[Embodiment 3]

Figure 6A:
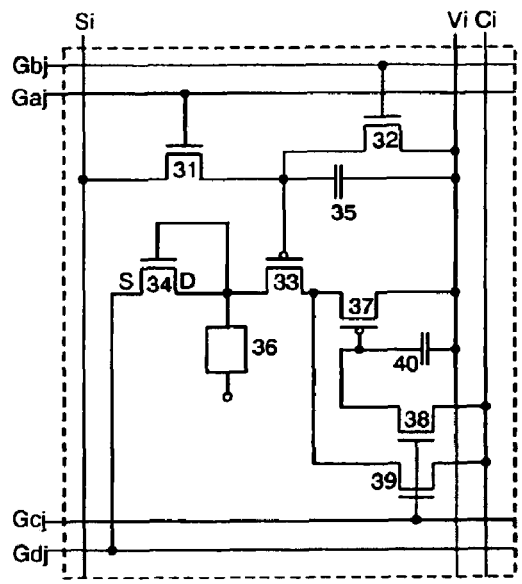
FIGS. 6A to 6C are diagrams showing a pixel of the light-emitting device of the present invention.
Figure 6B:
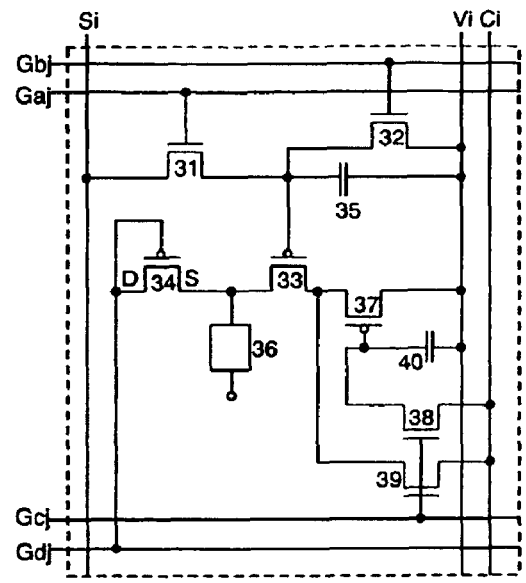
Figure 6C:
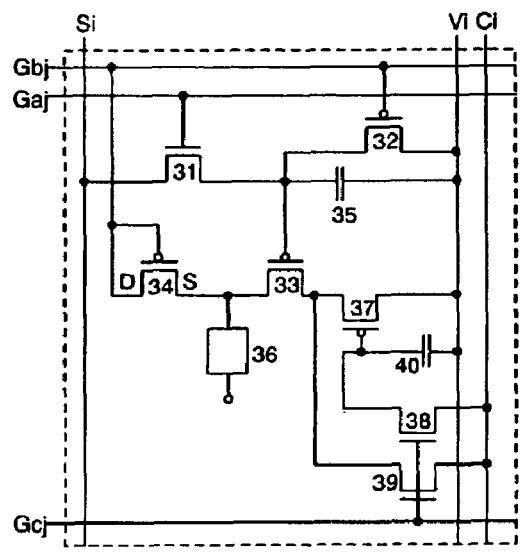

Although two kinds or more of the pixel outline of the light-emitting device of the invention was mentioned using by FIGS. 1A and 1B, this embodiment explains a detailed configuration example and operation of the pixel of FIG. 1B by using FIGS. 6A to 6C. Note that FIGS. 6A to 6C show, as a discharge diode 24, a transistor in diode connection.

The pixel 10 shown in FIG. 2A and the pixel 10 shown in FIGS. 6A to 6C are the same in the number of the elements configuring the pixel 10 and the connection relationship between the elements except the difference in connection of the discharge transistor 34 (hereinafter, denoted as a transistor 34), and hence the details on the connection of elements are omitted in this embodiment.

In the pixel 10 shown in FIG. 6A, the transistor 34 is an n-channel type. The transistor 34 has a gate electrode and a drain electrode that are connected with each other. Also, the transistor 34 has a source electrode connected to the fourth scanning line ($G_{dj}$). Incidentally, the invention is not limited to the configuration shown in FIG. 6A, i.e. the source electrode of the transistor 34 may be connected to the second scanning line ($G_{bj}$) instead of the fourth scanning line ($G_{bj}$).

In the pixel 10 shown in FIG. 6B, the transistor 34 is a p-channel type. The transistor 34 has a gate electrode and a drain electrode that are connected with each other and connected to the fourth scanning line ($G_{dj}$). Also, the transistor 34 has a source electrode connected to the light-emitting element 36.

In the pixel 10 shown in FIG. 6C, the transistor 34 is a p-channel type. The transistor 34 has a gate electrode and a drain electrode that are connected with each other to the second scanning line ($G_{bj}$). The transistor 34 has a source electrode connected to the light-emitting element 36. Also, by making the transistor 32 in a p-channel type, the fourth scanning line ($G_{dj}$) is eliminated to connect the gate electrode of the transistor 32, 34 to the second scanning line ($G_{bj}$).

Subsequently, explanation is made on the operation of the pixel 10 shown in FIGS. 6A to 6C. As described above, the operation for the pixel 10 can be roughly divided with setting operation of the pixel 10 (corresponding to FIG. 2A), light-emitting operation (corresponding to FIG. 2B), erasure operation for the pixel 10, and reverse-bias-applying operation to the light-emitting element 36 (corresponding to FIG. 2C). The three operations, i.e. setting operation, light-emitting operation and erasure operation, are the same as the operations of the pixel 10 explained using FIGS. 2A to 2C, and hence explanation is omitted in this embodiment. Explanation is only on the reverse-bias-applying operation.

In the pixel 10 shown in FIG. 6A, when the transistor 33 is off, a reverse bias is applied to the light-emitting element 36. When applying a reverse bias to the light-emitting element 36, the potential on the fourth scanning line ($G_{dj}$) is given lower than the potential on the counter electrode of the light-emitting element 36, to apply a reverse bias to the light-emitting element 36.

Similarly, in the pixel 10 shown in FIG. 6B, when the transistor 33 is off, a reverse bias is applied to the light-emitting element 36. Namely, by decreasing the potential on the fourth scanning line ($G_{dj}$) lower than the potential on the counter electrode of the light-emitting element 36, a reverse bias is applied to the light-emitting element 36. Meanwhile, the operation of applying a reverse bias to the pixel 10 shown in FIG. 6C is similar to that of the pixel 10 shown in FIG. 6B, and hence the explanation is omitted.

The operation of applying a reverse bias to the light-emitting element 36 may be made simultaneously with the setting operation for the pixel 10. For this reason, in the pixel 10 shown in FIG. 6C for example, setting may be made to simultaneously turn on the transistors 32, 34, 38, 39.

Incidentally, this embodiment can be desirably combined with Embodiment 1 or 2.

[Embodiment 4]

Figure 7:
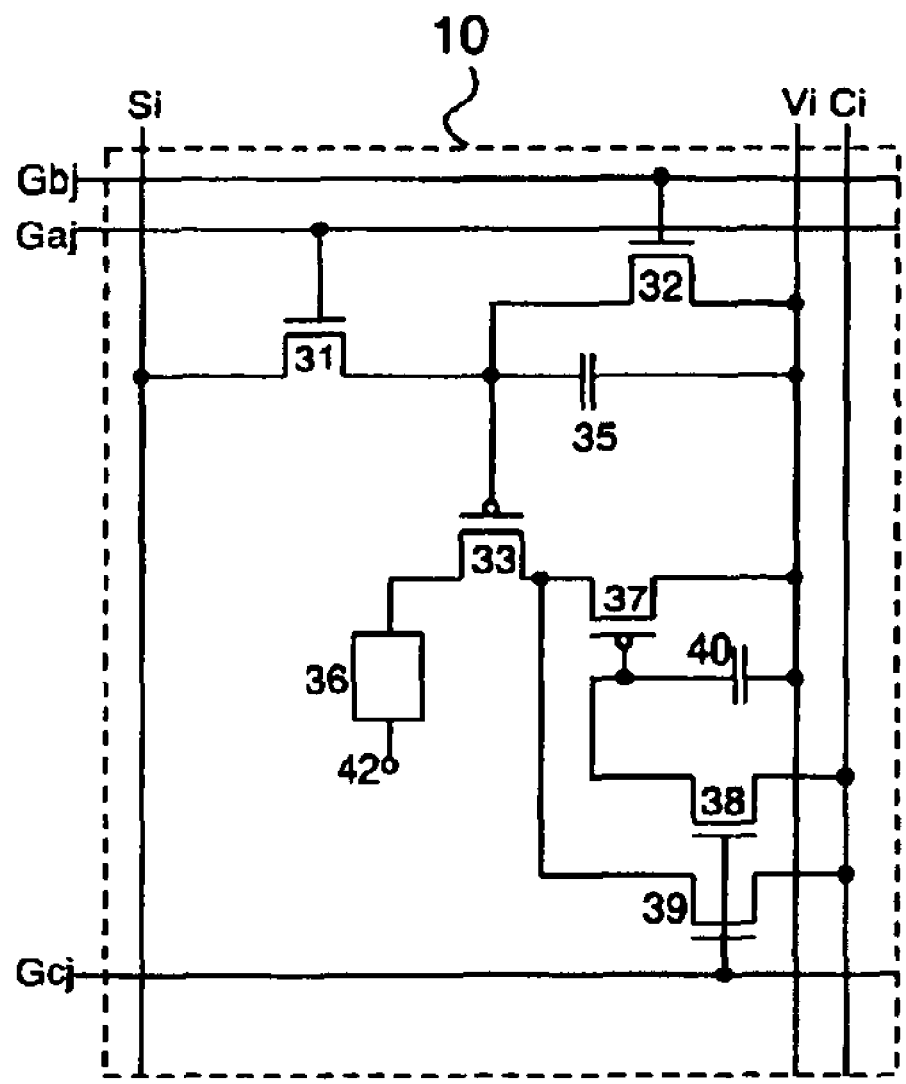
FIG. 7 is a diagram showing a pixel of the light-emitting device of the present invention.

This embodiment explains an embodiment different from Embodiments 1–3, by using FIG. 7.

The pixel 10 shown in FIG. 7 shows a case that there is no discharge transistor 14 in the pixel of FIG. 1A. The other elements possessed by the pixel 10 of FIG. 7 and the connection configuration of the elements are as per the description in Embodiment 1, and hence the explanation is omitted.

When applying a reverse bias to the pixel 10 of FIG. 7, the potential on the counter electrode 42 of the light-emitting element 36 is increased. This makes it possible to apply a reverse bias to the light-emitting element 36.

Incidentally, this embodiment can be desirably combined with Embodiment 1–3.

[Embodiment 5]

This embodiment explains a configuration of a light-emitting device of the invention, by using FIGS. 8A to 8D.

The light-emitting device of the invention has, on a substrate 1801, a pixel region 1802 arranged with a plurality of pixels in a matrix form. In the periphery of the pixel region 1802, there are provided a signal-line drive circuit 1803, a first scanning-line drive circuit 1804 and a second scanning-line drive circuit 1805. Note that the pixels in plurality possessed by the pixel region 1802 correspond to the pixel 10 described in Embodiment 1 to 4. Although there are provided, in FIG. 8A, the signal-line drive circuit 1803, and two sets of scanning-line drive circuits 1804, 1805, the invention is not limited to that, i.e. the number of drive circuits can be arbitrarily designed depending upon pixel configuration. Also, signals are externally supplied to the signal-line drive circuit 1803, the first scanning-line drive circuit 1804 and the second scanning-line drive circuit 1805 through FPCs 1806.

Figure 8A:
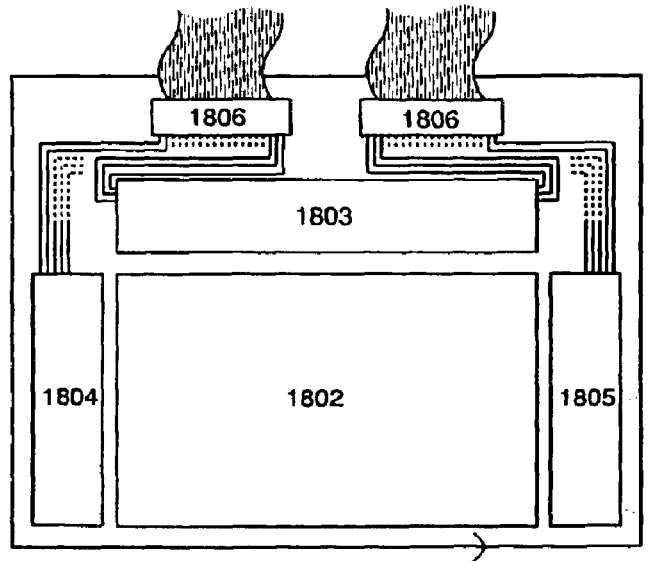
FIGS. 8A to 8D are overall views of the light-emitting device of the invention.
Figure 8B:
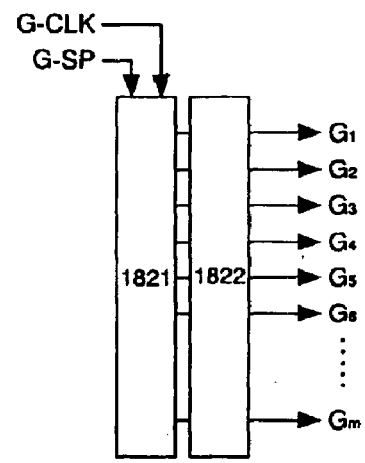

Explanation is made on the configuration of the first scanning-line drive circuit 1804 and the second scanning-line drive circuit 1805, by using FIG. 8B. The first scanning-line drive circuit 1804 and second scanning line drive circuit 1805 has a shift register 1821 and a buffer 1822. Briefly explaining the operation, the shift register 1821 outputs sequentially sampling pulses according to a clock signal (G-CLK), a start pulse (S-SP) and a clock inversion signal (G-CLKb). The sampling pulses then amplified by the buffer 1822 are inputted to the scanning lines and placed in a selected state row by row. By the selected scanning lines, the pixels to be controlled are written, in order, by a signal current $I_{data}$, from the signal line.

Incidentally, between the shift register 1821 and the buffer 1822, a level shifter circuit may be arranged. The arrangement of a level shifter circuit can increase the amplitude of voltage.

Figure 8C:
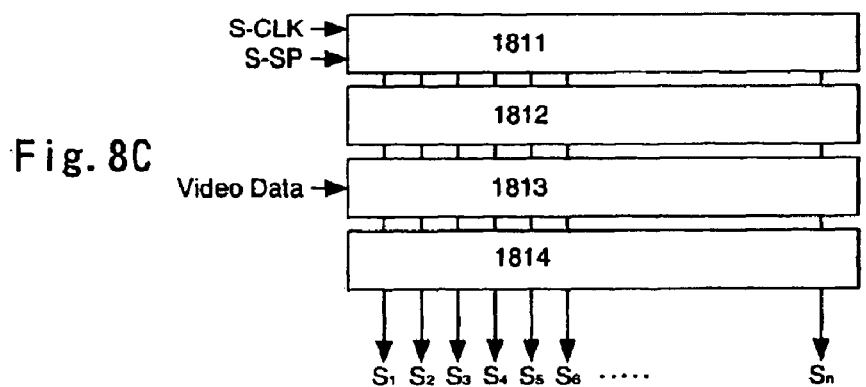
Figure 8D:
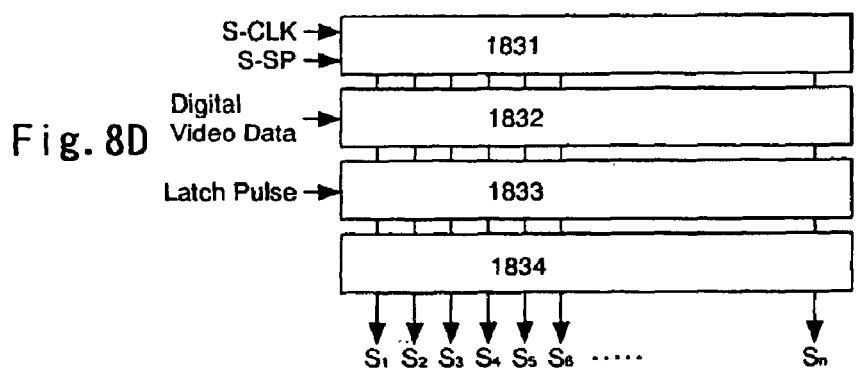

Explanation is now made on the configuration of a signal-line drive circuit 1803, by using FIGS. 8C and 8D. The signal-line drive circuit of FIG. 8C has a shift register 1811, a buffer 1812, a sampling circuit 1813 and a constant-current circuit 1814. Briefly explaining the operation, the shift register 1811 outputs sequentially sampling pulses according to a clock signal (G-CLK), a start pulse (S-SP) and a clock inversion signal (G-CLKb). The sampling pulses then amplified by the buffer 1822 are inputted to the sampling circuit 1813. The sampling circuit, inputted with a video signal, inputs the video signal to the constant-current circuit 1814 according to the input timing of sampling pulses.

Explanation is now made on a signal-line drive circuit 1803 having a different configuration from that of FIG. 8C, by using FIG. 8D. The signal-line drive circuit of FIG. 8D has a-shift register 1831, a first latch circuit 1832, a second latch circuit 1833 and a constant-current circuit 1834.

Briefly explaining the operation, the shift register 1831 is configured with using a plurality of flip-flop circuits (FFs), which is inputted by a clock signal (S-CLK), a start pulse (S-SP) and a clock inversion signal (S-CLKb). Sampling pulses are sequentially outputted according to the timing of these signals.

The sampling pulses outputted from the shift register 1831 are inputted to the first latch circuit 1832. The first latch circuit 1832 is inputted with a digital video signal to hold the video signal on the columns according to the input timing of sampling pulses.

In the first latch circuit 1832, when holding the video signal completes to the last column, a latch pulse is inputted to the second latch circuit 1833 during a horizontal blanking period. The video signal held by the first latch circuit 1832 is transferred, at one time, to the second latch circuit 1833. Thereupon, the video signal in an amount of one row is simultaneously inputted to the constant-current circuit 1834.

During the input of the video signal held on the second latch circuit 1833 to the constant-current circuit 1834, the shift register 1831 again outputs sampling pulses. From then on, this operation is repeated to carry out video signal processing in an amount of one frame. Incidentally, the constant-current circuit 1834, in some cases, has a role to convert a digital signal into an analog signal.

Incidentally, this embodiment can be desirably combined with Embodiment 1 to 4.

[Embodiment 6]

When the above-mentioned light emitting device of the present invention is driven digitally, in order to represent a multi-gray-scale image, a method configured by combining a digital gray scale scheme and an area-gray-scale scheme, and a method configured by combining by a digital gray scale scheme and a time-gray-scale scheme (hereafter referred to as time-gray-scale scheme) have been proposed. In this embodiment, the above-mentioned time-gray-scale scheme will be described using FIGS. 9A and 9B. In addition, FIG. 9A shows a timing chart in a case that the longitudinal axis denotes a scanning line, and the horizontal axis denotes a time, while FIG. 9B shows a timing chart in a case that attention is paid to j-th row.

In display devices such as liquid crystal display devices and light emitting devices, a frame frequency is normally about 60 Hz. That is, screen rendering is performed about 60 times per second. This enables flickers (flickering of a screen) not to be recognized by the human's eyes. At this time, a period during which screen rendering is performed once is called one frame period.

As an example in this embodiment, descriptions will be made of a time-gray-scale-scheme disclosed in the publication as Patent Document 1. In the time-gray-scale scheme, one frame period is divided into a plurality of subframe periods. In many cases, the number of divisions at this time is identical to the number of gray scale bits. To describe briefly, a case where the number of divisions is identical to the number of gray scale bits is shown. In other words, since the 3-bit gray scale is employed in this embodiment, an example is shown in which one frame period is divided into three subframe periods SF1 to SF3.

Each of the subframe periods includes a writing (address) period Ta and a light emission (sustain) period Ts. The address period is a period during which a video signal is written to a pixel, and the length thereof is the same among respective subframe periods. The sustain period is a period during which the light emitting element emits light in response to the video signal written in the address period. At this time, the sustain periods SF1 to SF3 are set at a length ratio of Ts1:Ts2:Ts3=4:2:1. More specifically, the length ratio of n sustain periods is set to $2^{(n-1)}:2^{(n-2)}: \ldots :2^1:2^0$. Depending on which one of the sustain periods a light emitting element performs emission, the length of the period during which each pixel emits light in one frame period is determined, and the gray scale representation is thus performed.

In other words, by taking a light emitting state or a non-light emitting state for the sustain (light emission) periods Ts1 to Ts3, and utilizing the length of the total light emission time, 8 gray scales having brightnesses of 0%, 14%, 28%, 43%, 57%, 71%, 86%, and 100% can be expressed. The brightness is 57% if there is light emission during Ts1 and no light emission during Ts2 and Ts3, and while the brightness is 71%, light emission occurs during Tsl and Ts3 but not during Ts2. Briefly, with the time-gray-scale scheme, however, the same gray scale-is expressed by emitting light at 100% brightness for only 71% of the entire light emission period.

In FIGS. 9A and 9B, the subframe period SF3 has an erase period Te3. The erase period corresponds to a period for erasing and resetting the video signal written in the pixel. And, for example, in the pixel 10 shown in FIGS. 2A to 2C, erasing is performed at the same timing with reverse biases. That is to say, in the pixel 10, an erasing operation and a reverse biases applying operation are performed at the same time during the erasing period Te.

The number of divisions for subframe periods may be increased to increase the number of display gray scales. Also, the order of the subframe periods does not necessarily need to be the order from an upper bit to a lower bit as shown in FIGS. 9A and 9B, and the subframe periods may be disposed at random within one frame period. In addition, the order may be variable within each frame period.

In addition, this embodiment can be arbitrarily combined with Embodiments 1 to 5.

[Embodiment 7]

This embodiment briefly explains a sectional structure of the light-emitting device of the invention. Note that FIG. 10 depicts only a sectional structure of a drive TFT 507 and light-emitting element in order to simplify explanation.

Figure 10:
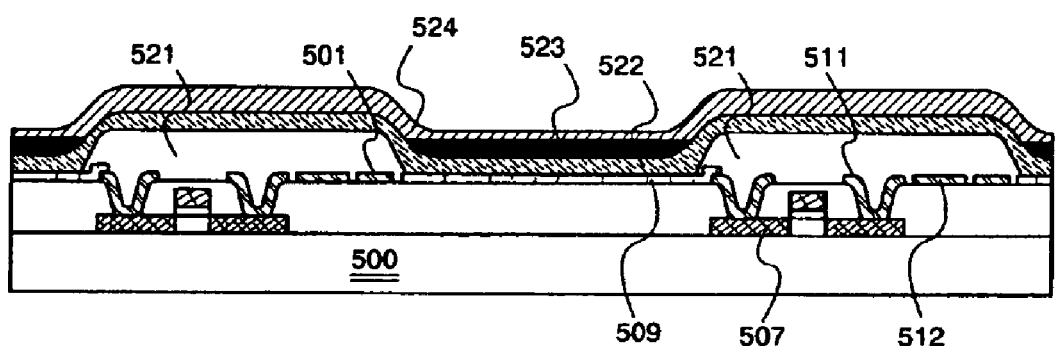
FIG. 10 is a view showing a sectional structure of the light-emitting device of the invention.

In FIG. 10, 500 is a substrate having an insulating surface. A drive TFT 507 is provided on the substrate 500. Interconnections are provided to be connected to an impurity region provided in an active layer possessed by the drive TFT 507, while a pixel electrode 509 is provided connected to the interconnection. An organic conductive film 522 is provided on the pixel electrode 509, and an organic thin film (light-emitting layer) 523 is provided on the organic conductor film 522. A counter electrode 524 is provided on the organic thin film (light-emitting layer) 523.

The overlying layers, of the pixel electrode 509, the organic conductive film 522, the organic thin film (light-emitting layer) 523 and the counter electrode 524, correspond to a light-emitting element. For the light emitted from the light-emitting element, there are included a case of light emission toward the substrate 500 and a case of light emission away from the substrate 500. The former case is called as downward light emission while the latter case is as upward light emission. In the case of downward light emission, the pixel electrode 509 corresponds to an anode while the counter electrode 524 to a cathode. Meanwhile, in the case of upward light emission, the pixel electrode 509 corresponds to a cathode while the counter electrode 524 to an anode.

Incidentally, the organic thin film (light-emitting layer) 523 can suitably use a material for emitting light in red, blue, green, white or the like. When structuring an organic thin film (light-emitting layer) 523 by using a material for emitting white light, it is preferred to form the pixel electrode 509 or the counter electrode 524 by a transparent conductive film and arrange a color-filter coloring layer on a surface opposed thereto. By doing so, color display can be realized even by using a white-light material.

This embodiment can be desirably combined with Embodiment 1 to 6.

[Embodiment 8]

Electronic appliances using the light emitting device of the present invention include, for example, video cameras, digital cameras, goggle type displays (head mount displays), navigation systems, audio reproducing devices (such as car audio and audio components), notebook personal computers, game machines, mobile information terminals (such as mobile computers, mobile phones, portable game machines, and electronic books), and image reproducing devices provided with a recording medium (specifically, devices for reproducing a recording medium such as a digital versatile disc (DVD), which includes a display capable of displaying images). Practical examples are shown in FIGS. 11A to 11H.

Figure 11A:
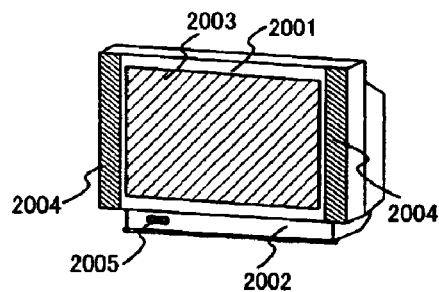
FIGS. 11A to 11H are views of electronic appliances to which the invention is applicable.

FIG. 11A shows a light emitting device, which contains a casing 2001, a support base 2002, a display portion 2003, a speaker portion 2004, a video input terminal 2005, and the like. The present invention can be applied to the display portion 2003. Further, the light emitting device shown in FIG. 11A is completed with the present invention. Since the light emitting device is of self-light emitting type, it does not need a back light, and therefore a display portion that is thinner than that of a liquid crystal display can be obtained. Note that light emitting devices include all information display devices, for example, personal computers, television broadcast transmitter-receivers, and advertisement displays.

Figure 11B:
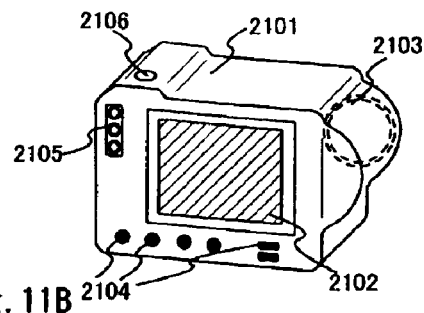

FIG. 11B shows a digital still camera, which contains a main body 2101, a display portion 2102, an image receiving portion 2103, operation keys 2104, an external connection port 2105, a shutter 2106, and the like. The present invention can be applied to the display portion 2102. Further, the digital still camera shown in FIG. 11B is completed with the present invention.

Figure 11C:
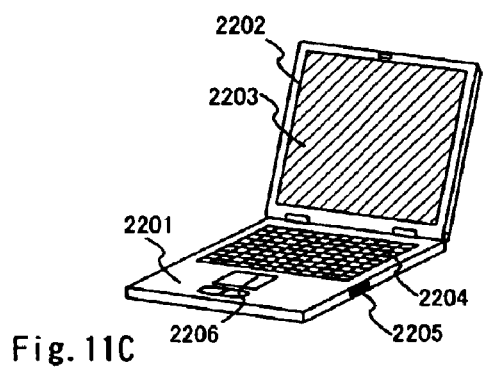

FIG. 11C shows a notebook personal computer, which contains a main body 2201, a casing 2202, a display portion 2203, a keyboard 2204, external connection ports 2205, a pointing mouse 2206, and the like. The present invention can be applied to the display portion 2203. Further, the light emitting device shown in FIG. 11C is completed with the present invention.

Figure 11D:
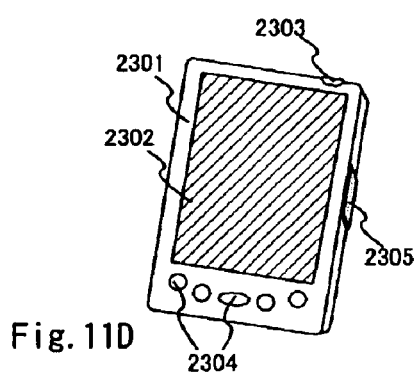

FIG. 11D shows a mobile computer, which contains a main body 2301, a display portion 2302, a switch 2303, operation keys 2304, an infrared port 2305, and the like. The present invention can be applied to the display portion 2303. Further, the mobile computer shown in FIG. 11D is completed with the present invention.

Figure 11E:
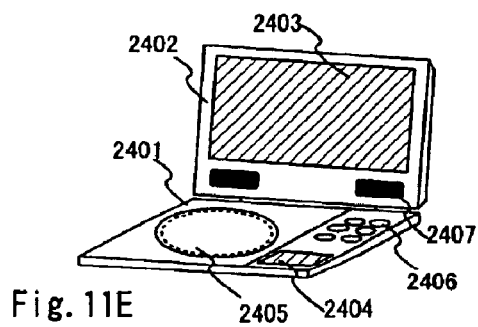

FIG. 11E shows a portable image reproducing device provided with a recording medium (specifically, a DVD reproducing device), which contains a main body 2401, a casing 2402, a display portion A 2403, a display portion B 2404, a recording medium (such as a DVD) read-in portion 2405, operation keys 2406, a speaker portion 2407, and the like. The display portion A 2403 mainly displays image information, and the display portion B 2404 mainly displays character information. The present invention can be used in the display portion A 2403 and in the display portion B 2404. Note that family game machines and the like are included in the image reproducing devices provided with a recording medium. Further, the DVD reproducing device shown in FIG. 11E is completed with the present invention.

Figure 11F:
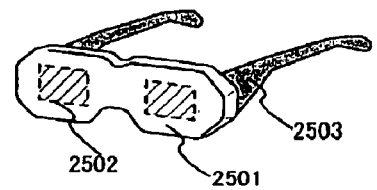

FIG. 11F shows a goggle type display (head mounted display), which contains a main body 2501, a display portion 2502, an arm portion 2503, and the like. The present invention can be used in the display portion 2502. The goggle type display shown in FIG. 11F is completed with the present invention.

Figure 11G:
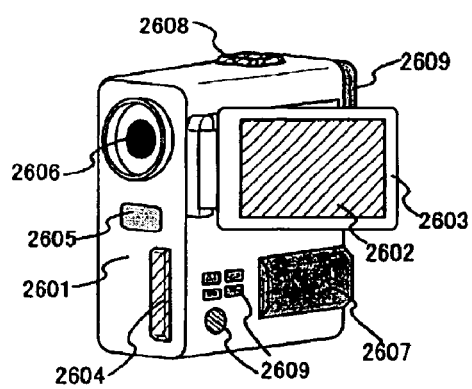

FIG. 11G shows a video camera, which contains a main body 2601, a display portion 2602, a casing 2603, external connection ports 2604, a remote control reception portion 2605, an image receiving portion 2606, a battery 2607, an audio input portion 2608, operation keys 2609, an eyepiece portion 2610, and the like. The present invention can be used in the display portion 2602. The video camera shown in FIG. 11G is completed with the present invention.

Figure 11H:
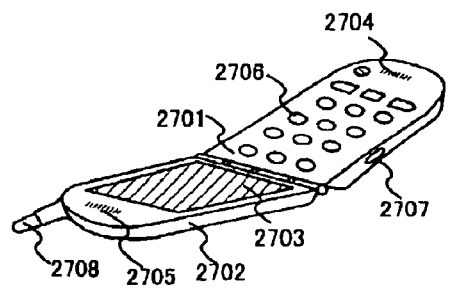

Here, FIG. 11H shows a mobile phone, which contains a main body 2701, a casing 2702, a display portion 2703, an audio input portion 2704, an audio output portion 2705, operation keys 2706, external connection ports 2707, an antenna 2708, and the like. The present invention can be used in the display portion 2703. Note that, by displaying white characters on a black background, the current consumption of the mobile phone can be suppressed. Further, the mobile phone shown in FIG. 11H is completed with the present invention.

When the emission luminance of light emitting materials is increased in the future, the light emitting device will be able to be applied to a front or rear type projector for magnifying and projecting outputted light containing image information by a lens or the like.

Cases are increasing in which the above-described electronic appliances display information distributed via electronic communication lines such as the Internet and CATVs (cable TVs). Particularly increased are cases where dynamic picture information is displayed. Since the response speed of the light emitting materials is very high, the light emitting device is preferably used for dynamic picture display.

Since the light emitting device consumes power in a light emitting portion, information is desirably displayed so that the light emitting portions are reduced as much as possible. Thus, in the case where the light emitting device is used for a display portion of a mobile information terminal, particularly, a mobile phone, an audio playback device, or the like, which primarily displays character information, it is preferable that the character information be formed in the light emitting portions with the non-light emitting portions being used as the background.

As described above, the application range of the present invention is very wide, so that the invention can be used for electronic appliances in all of fields. The electronic appliances according to this embodiment may use the structure of the light emitting device according to any one of Embodiments 1 to 7.

[Embodiment 9]

The electronic device shown in Embodiment 8 has a module, mounting an IC including a controller, a power circuit and the like, mounted on a panel in a state sealed with the light emitting elements. The module and the panel both correspond to one form of a display device. Herein, explanation is made on a concrete configuration of the module.

Figure 12A:
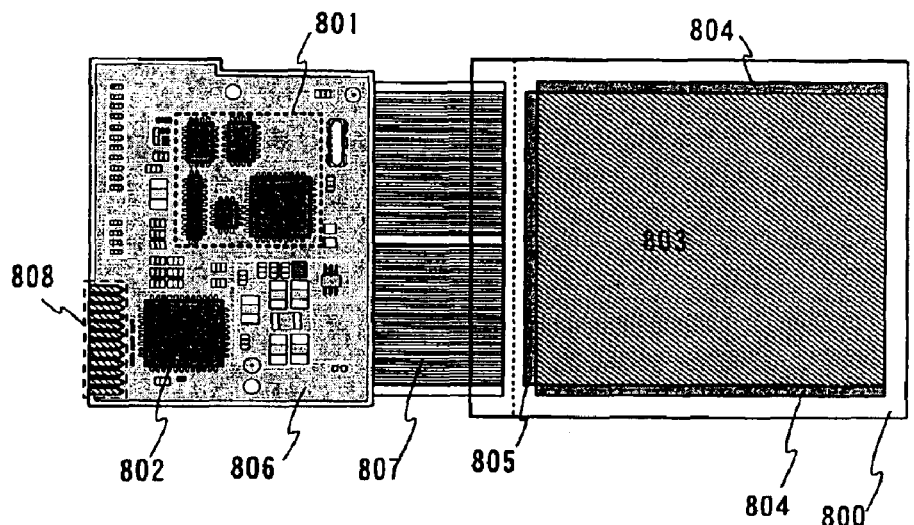
FIGS. 12A and 12B are views showing a module.

FIG. 12A shows an external view of a module having a controller 801 and power circuit 802 mounted on a panel 800. The panel 800 is provided with a pixel region 803 having light-emitting elements on respective pixels, a scanning-line drive circuit 804 for selecting the pixel possessed by the pixel region 803, and a signal-line drive circuit 805 for supplying a video signal to a selected pixel. Meanwhile, a printed board 806 is provided with a controller 801 and a power circuit 802. The various signals and power voltage outputted from the controller 801 or power circuit 802 are supplied to the pixel region 803 of the panel 800, the scanning-line drive circuit 804 and the signal-line drive circuit 805 through an FPC 807. The power voltage and various signals to the printed board 806 are supplied through an interface (I/F) section 808 arranged with a plurality of input terminals.

Incidentally, although this embodiment is mounted with the printed board 806 on the panel 800 by the use of the FPC, it is not limited to this structure. The COG (chip on glass) scheme may be used to directly mount the controller 801 and power circuit 802 on the panel 800. Also, on the printed board 806, there is a possible case that noise be involved in the power voltage or signal or signal rise be blunted, due to the capacitances formed between the extended interconnections, the resistances possessed by the interconnections themselves. Consequently, various elements such as capacitors and buffers may be provided on the printed board 806, to prevent against noise be involved in the power voltage or signal or blunted signal rise.

Figure 12B:
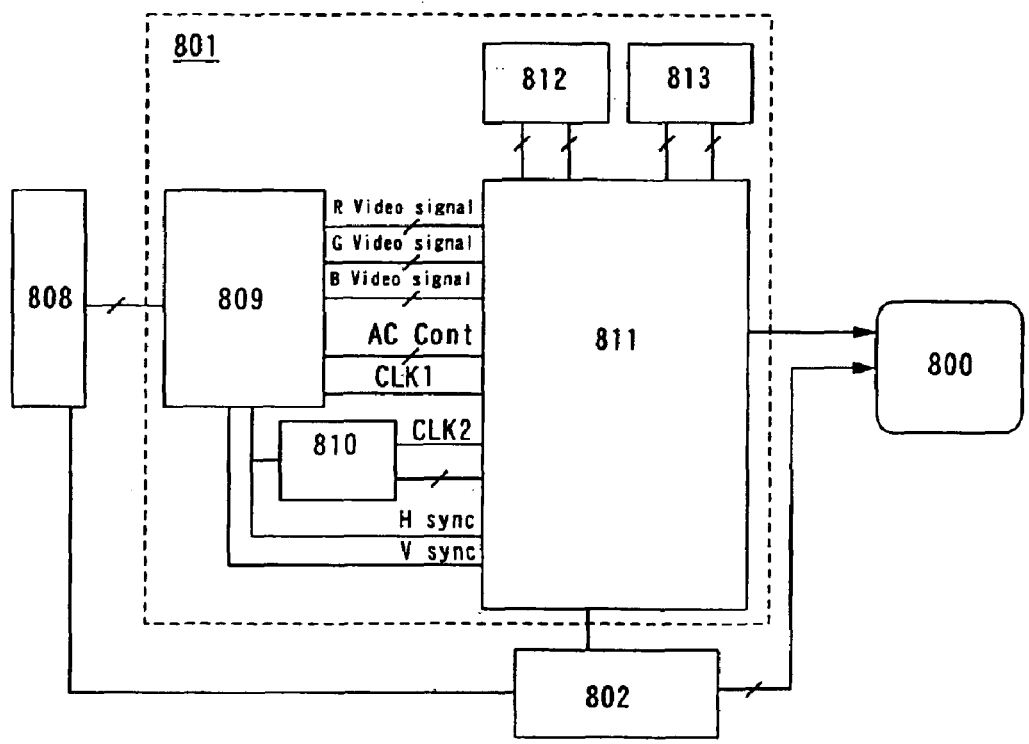

FIG. 12B shows, in a block diagram, a configuration of the printed board 806. The various signals and power voltage supplied to the interface 808 are then supplied to the controller 801 and the power circuit 802. The controller 801 has an analog interface circuit 809, a phased-locked loop (PLL) 810, a control-signal generating circuit 811 and SRAMs (static random access memories) 812, 813. Although SRAMs are herein used, it is possible to use SDRAMs or, DRAMs (dynamic random access memories) if data write or read is possible at high speed, in place of the SRAMs.

The analog video signal, supplied through the interface 808, is A/D-converted and parallel-serial converted in the analog interface circuit 809, thus being inputted as a digital video signal corresponding to the colors of R, G and B to the control-signal generating circuit 811. Also, on the basis of the various signals supplied through the interface 808, an Hsync signal, a Vsync signal, a clock signal CLK and the like are generated in the analog interface circuit 809 and inputted to the control signal generating circuit 811. Where the digital video signal is directly inputted to the interface 808, there is no need to arrange the analog interface circuit 809.

The phase-locked loop 810 has a function to combine the frequency of various signals supplied through the interface 808 with the operating frequency of the control-signal generating circuit 811. The operating frequency of the control-signal generating circuit 811 is not necessarily the same as the frequency of the various signals supplied through the interface 808, but adjusted, in the phase-locked loop 810, the operating frequency of the control-signal generating circuit 811 in a manner of synchronization with one another.

The video signal inputted to the control-signal generating circuit 811 is once written to and held on the SRAM 812, 813. The control-signal generating circuit 811 reads out, bit by bit, the video signals corresponding to all the pixels of among all the bits of video signals held on the SRAM 812, and supplies them to the signal-line drive circuit 805 of the panel 800. The control-signal generating circuit 811 supplies the information concerning a time period the light-emitting element of each bit causes light emission, to the scanning-line drive circuit 804 of the panel 800. The power circuit 802 supplies a predetermined power voltage to the panel 800 of the signal-line drive circuit 805, scanning-line drive circuit 804 and pixel region 803.

Figure 13:
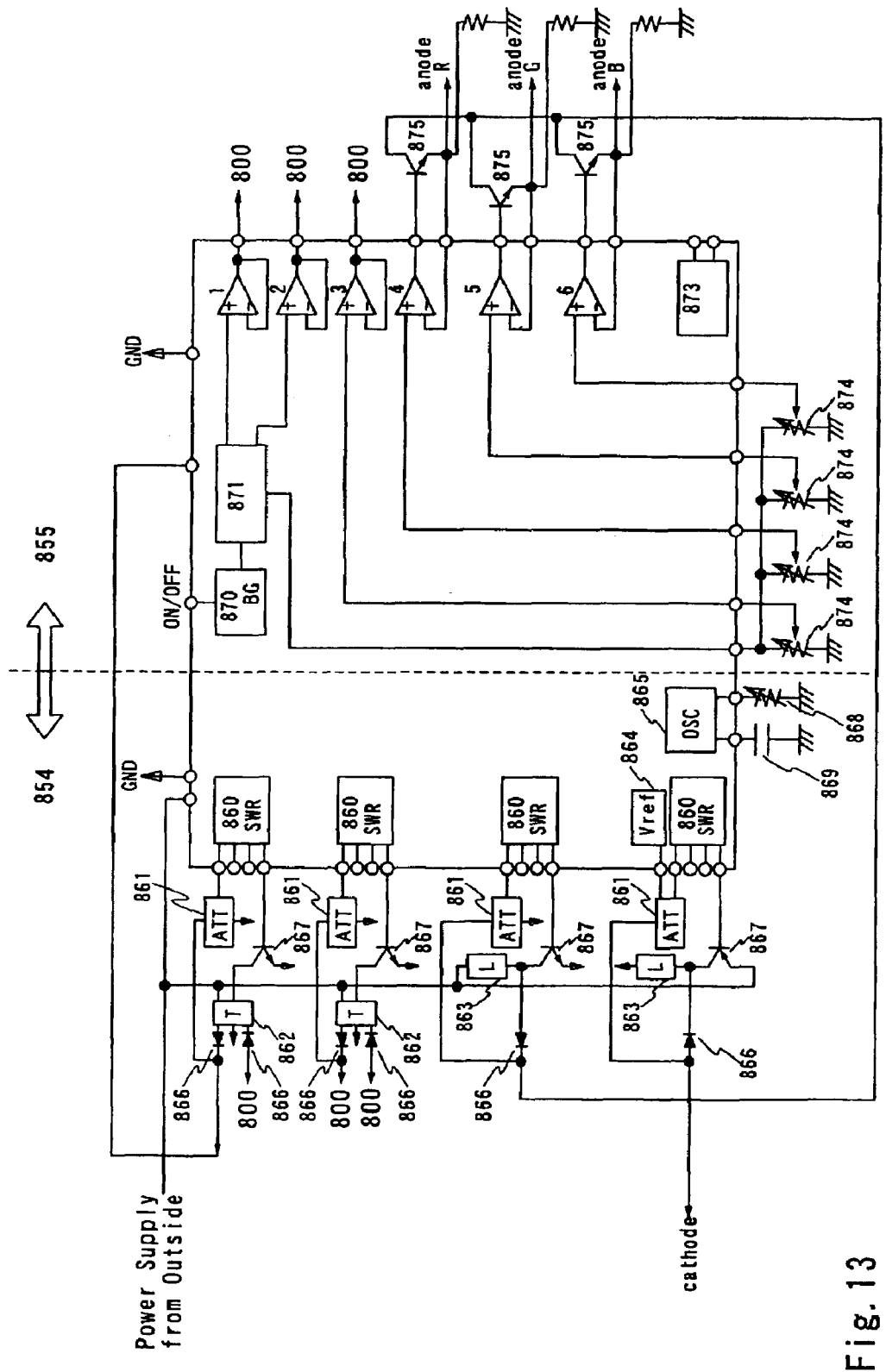
FIG. 13 is a diagram showing a power circuit.

Explanation is now made on the configuration of the power circuit 802, by using FIG. 13. The power circuit 802 comprises a switching regulator 854 using four switching regulator controls 860 and a series regulator 855. Generally, the switching regulator, small in size and light in weight as compared to the series regulator, can raise voltage and inverts polarities besides voltage reduction. On the other hand, the series regulator, used in voltage reduction, has a well output voltage accuracy as compared to the switching regulator, hardly causing ripples or noises. The power circuit 802 of this embodiment uses a combination of the both.

The switching regulator 854 shown in FIG. 13 has a switching regulator control (SWR) 860, an attenuator (ATT) 861, a transformer (T) 862, an inductor (L) 863, a reference power source (Vref) 864, an oscillator circuit (OSC) 865, a diode 866, a bipolar transistor 867, a varistor 868 and a capacitance 869. When a voltage of an external Li-ion battery (3.6 V) or the like is transformed in the switching regulator 854, generated are a power voltage to be supplied to a cathode and a power voltage to be supplied to the switching regulator 854.

The series regulator 855 has a band-gap circuit (BG) 870, an amplifier 871, operational amplifiers 1–6, a current source 873, a varistor 874 and a bipolar transistor 875, and supplied with a power voltage generated at the switching regulator 854. In the series regulator 855, a power voltage generated by the switching regulator 854 is used to generate a power voltage to be supplied to an interconnection (current supply line) for supplying current to the anodes of various-color of light-emitting elements depending upon a constant voltage generated by the band-gap circuit 870.

Incidentally, the current source 873 is used for a drive scheme to which the current of video signal is written to the pixel. In this case, the current generated by the current source 873 is supplied to the signal-line drive circuit 805 of the panel 800. In the case of a drive scheme to write the video signal voltage to the pixel, the current source 873 need not necessarily be provided.

Figure 14:
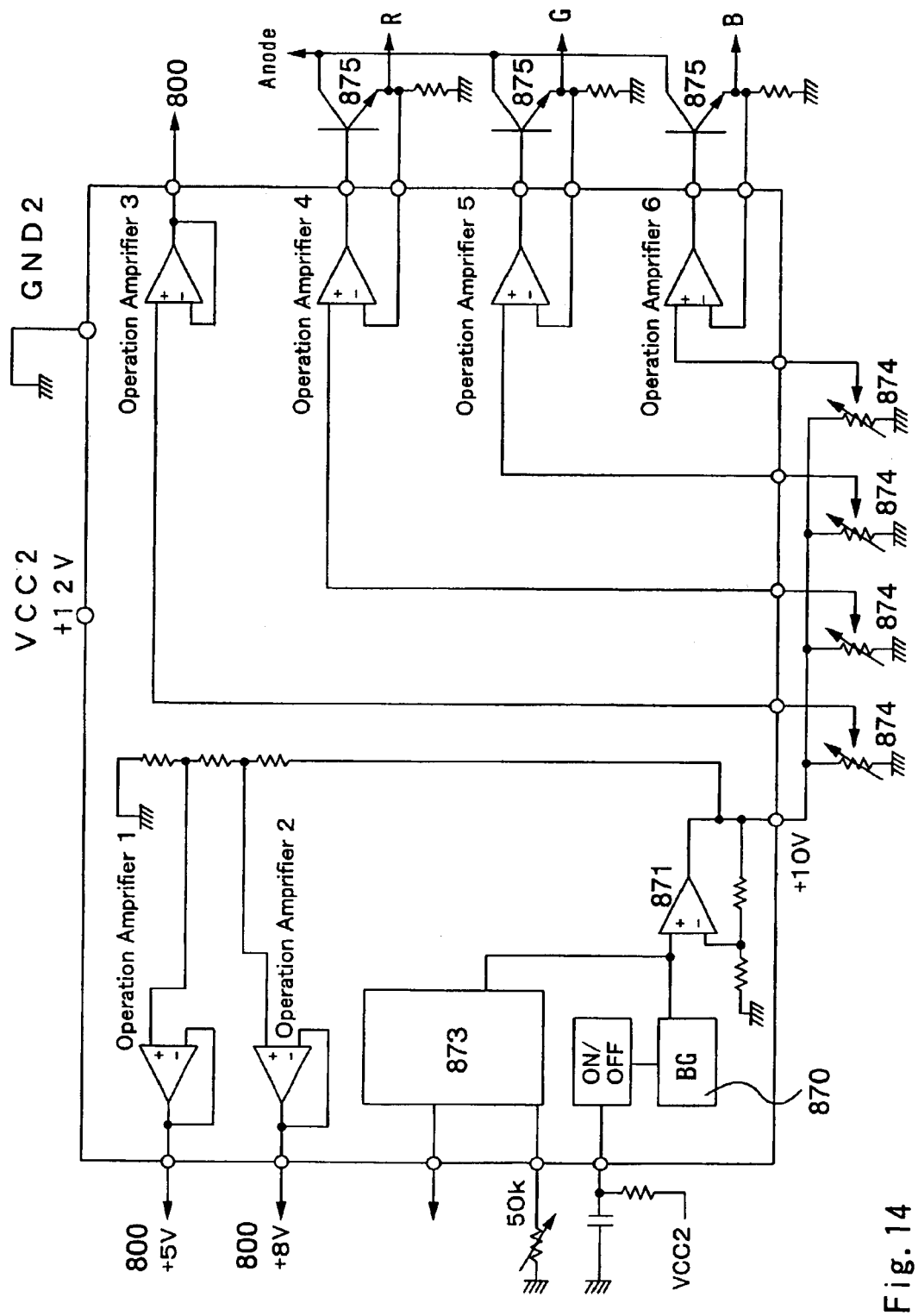
FIG. 14 is a diagram showing a series regulator.

Explanation is briefly made on the operation of the series regulator 855, as a constituent element of the power circuit 802, by using FIG. 14. The band-gap circuit 870 generates a reference voltage. The reference voltage is amplified by the amplifier 871 where a power of 10 V is generated. Also, the voltage generated by the band-gap circuit 870 is used also for the current source 873.

Incidentally, the band-gap circuit 870 is controlled by an external ON/OFF terminal. This is arranged because there is a possible case that the voltage supplied from the switching regulator 854 is unstable mainly upon a power rise or the like which power, if used as it is, makes it impossible to obtain a desired signal from the band-gap circuit 870. The ON/OFF terminal provides delay to suppress against such phenomenon.

The operational amplifier 1 supplies a +5 V voltage divided, by an internal resistance, of a +10 V voltage supplied from the amplifier 871, thus serving as a buffer. The operational amplifier 2 supplies a +8 V voltage divided, by an internal resistance, of a +10 V voltage supplied from the amplifier 871, thus serving as a buffer. The operational amplifier 3 supplies a voltage divided, by an external varistor, of a +10 V voltage supplied from the amplifier 871, thus serving as a buffer. The operational amplifiers 4–6 supply a voltage divided, by an external varistor, of a +10 V voltage supplied from the amplifier 871, thus serving as buffers. Incidentally, because the operation amplifiers 4–6 require much amount of output current, transistors 875 are used in the final output stage. The current source 873 converts, by an external resistance, a reference voltage generated by the band-gap circuit 870 into a current, and inverts and outputs it by an internal current mirror. Because this current source 873 has a supply current amount possibly dependent upon a temperature change, there is a need to suppress temperature change to a small extent. In this configuration, the series regulator 855 configures six direct-current power sources due to the +12 V power source configured by the switching regulator 854.

Figure 15:
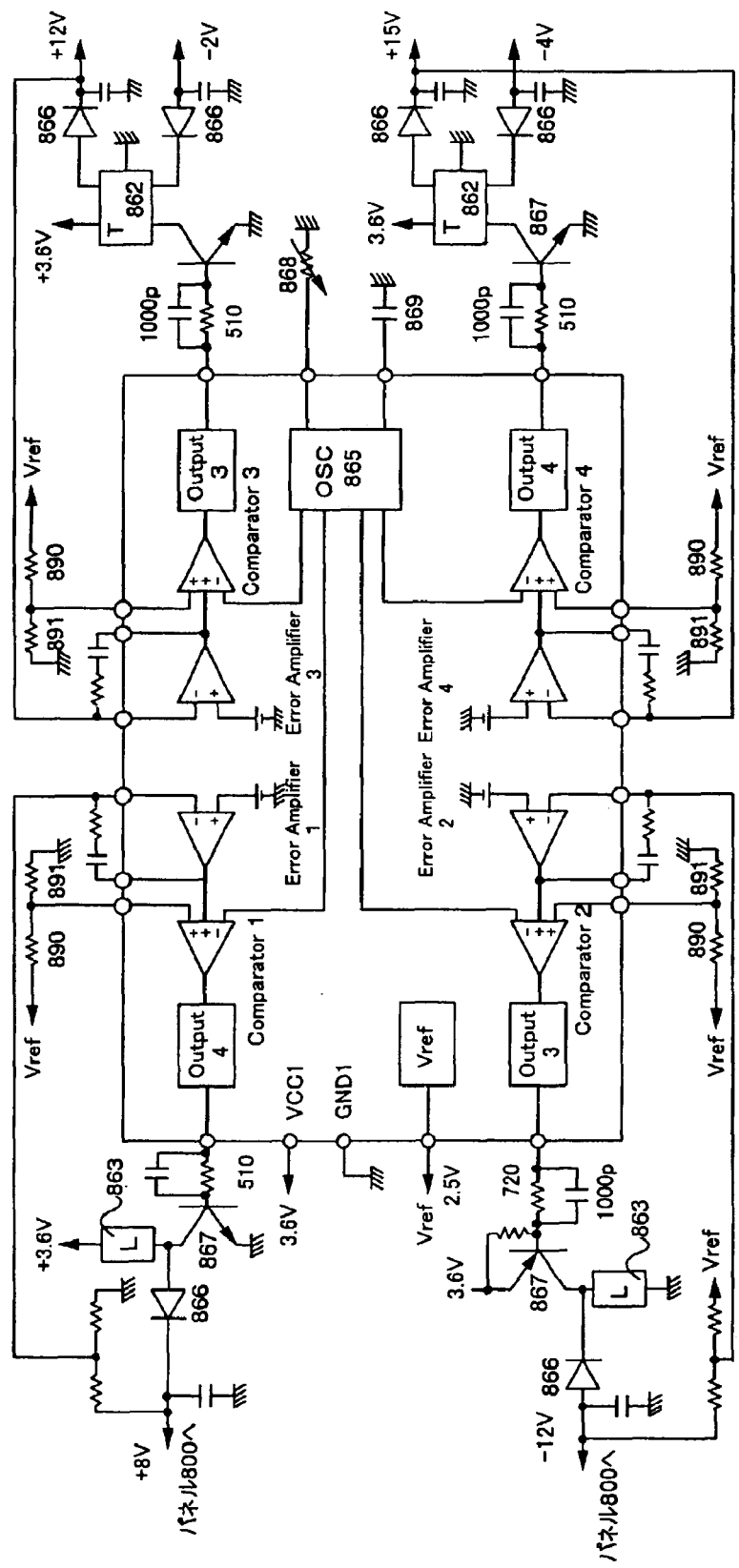
FIG. 15 is a diagram showing a switching regulator.

Explanation is now briefly made on the configuration and operation of the switching regulator 854 as a constituent element of the power circuit 802, by using FIG. 15. The switching regulator control (SWR) 860 is configured with error amplifiers 1–4, comparators 1–4 and output circuits 1–4. The ATT 861 is configured with resistances 890, 891. The error amplifier 1–4 detects an output voltage of the switching regulator. The error amplifier 1–4 is fixed in voltage gain and capable of making a stable phase compensation for the system. The comparator 1–4 is a voltage comparator having one inverted input and two non-inverted inputs, which is a voltage-pulse width converter for controlling on-time of an output pulse depending on an input voltage. The constituent elements other than the above of the switching regulator 854 were explained in the above and hence omitted.

The switching regulator 854 is operating at all times in either mode of transistor 867 operation of on or off. By changing the time ratio of the modes, direct-current output voltage is stabilized. Consequently, the transistor 867 has less power loss, serving as a power source well in power conversion efficiency. However, because on/off switching frequency is at high frequency, the transformer 862 can be reduced in size. Herein, the switching regulator 854 is inputted by a power of +3.6 V to boost the voltage, thereby configuring six direct-current power sources. The output voltages are +12 V, −2 V, +8 V, −12 V, +5 V and −3V. Of these, +12 V and −2 V, and +5 V and −3 V are generated at the same circuits.

Figure 16:
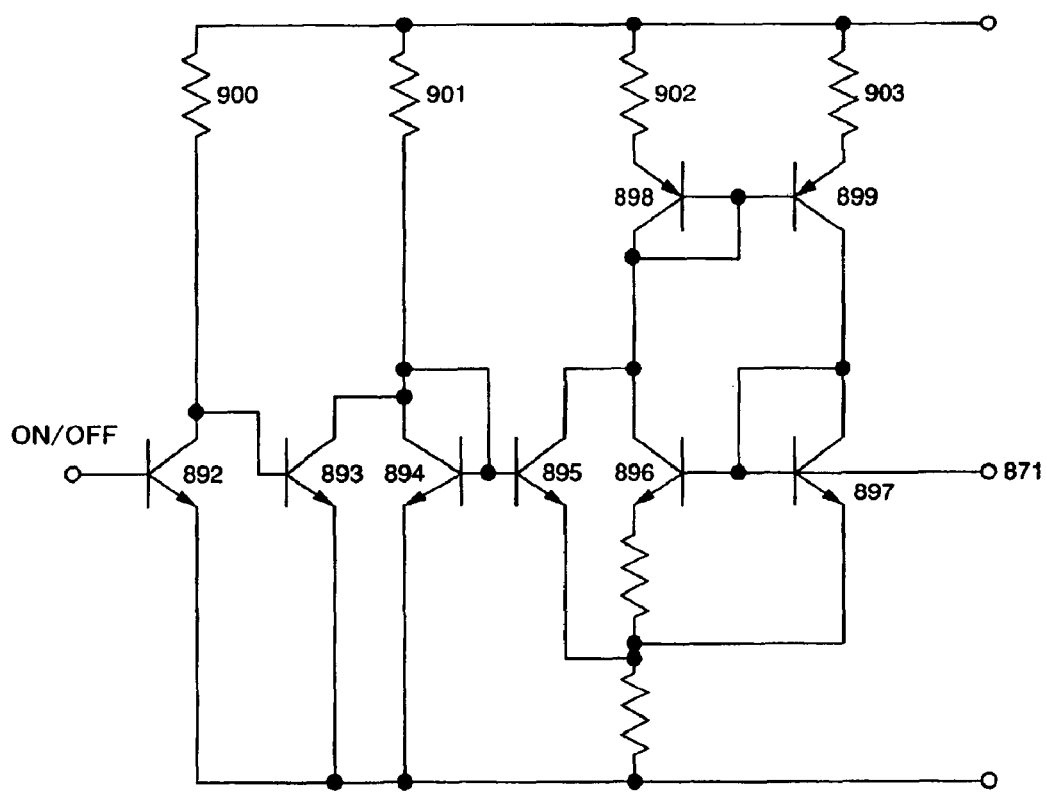
FIG. 16 is a diagram showing a band-gap circuit.

Explanation is now made on the configuration of the ON/OFF terminal and band-gap circuit 870, by using FIG. 16. The band-gap circuit 870 is configured with transistors 892–899 and resistances 900–903. An output terminal is connected to the amplifier 871. The band-gap circuit having a configuration of FIG. 016 has a function to generate a reference voltage.

Figure 17:
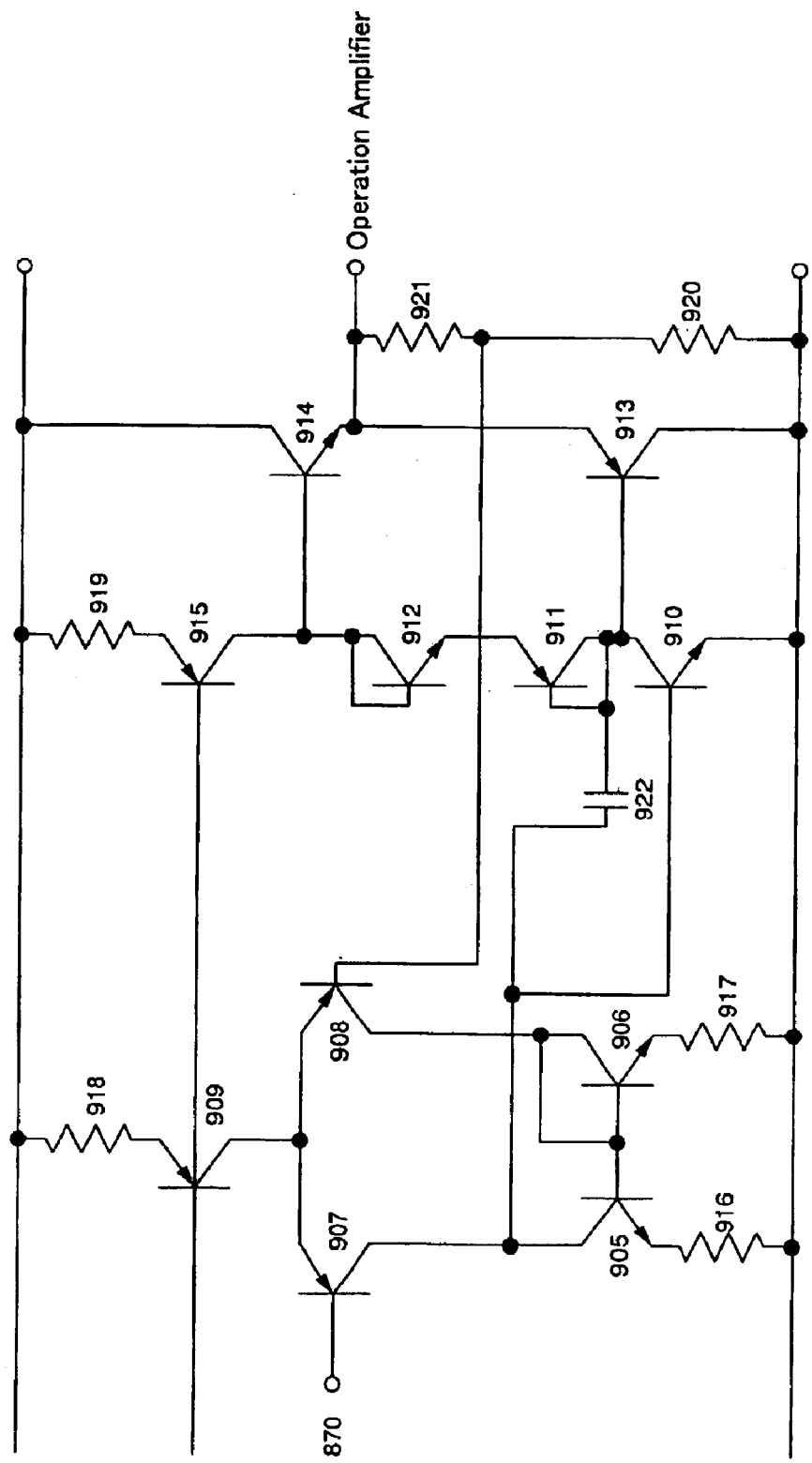
FIG. 17 is a diagram showing a DC amplifier.

Subsequently, explanation is made on the configuration of the amplifier (DC amplifier) as a constituent element of the series regulator 855, by using FIG. 17. The amplifier 871 has transistors 905–915, resistances 916–920 and a capacitance 922. An input terminal is supplied by a signal from the band-gap circuit 870. The signal at the output terminal is supplied to the operational amplifiers 1–6.

Figure 18:
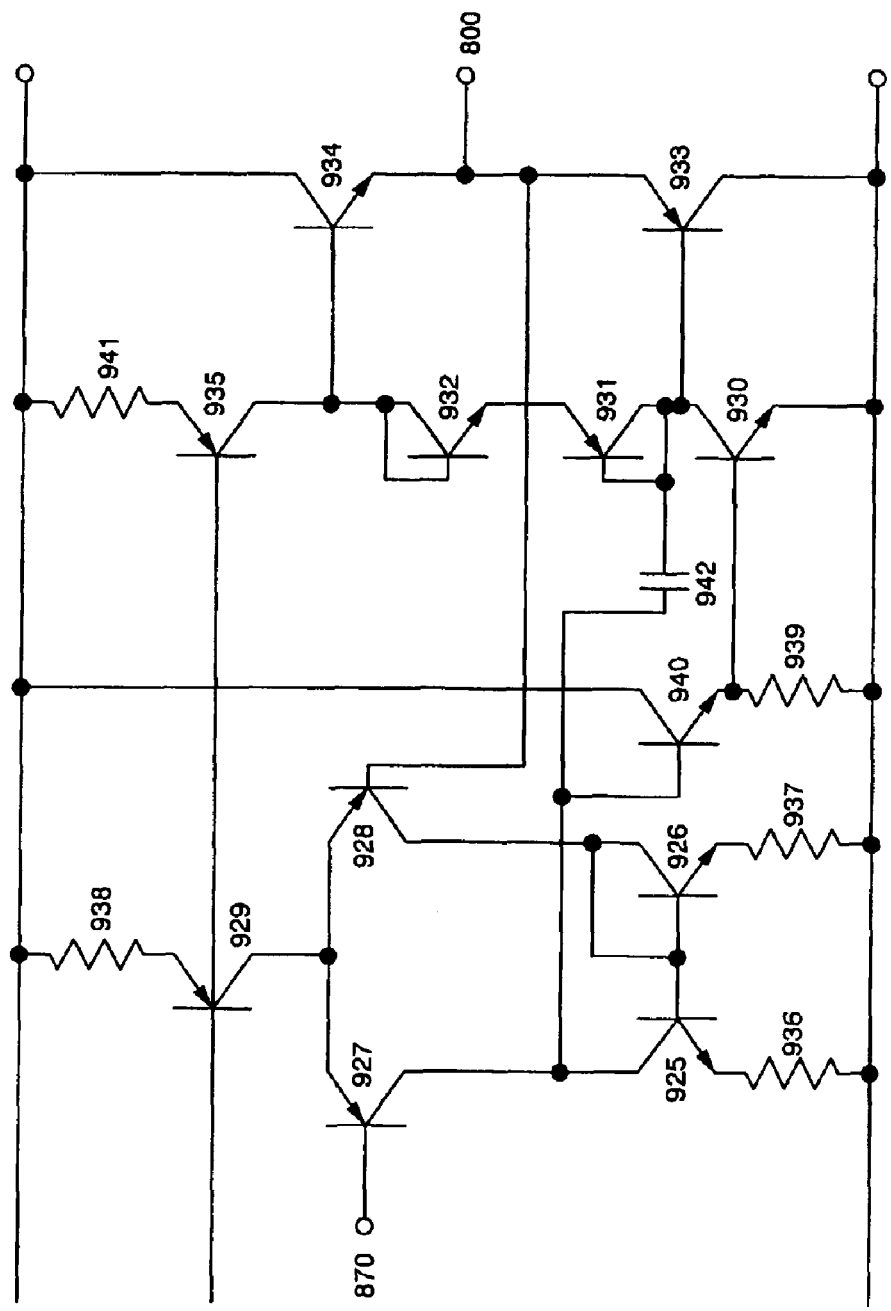
FIG. 18 is a diagram showing an operational amplifier.

The configuration of the operational amplifier 1–3 is explained by using FIG. 18. The operational amplifier 1–3 has transistors 925–935, 940, resistances 936–939, 941, and a capacitance 942. The input terminal is supplied with a signal from the band-gap circuit 870. The signal at the output terminal is supplied to the panel 800.

Figure 19:
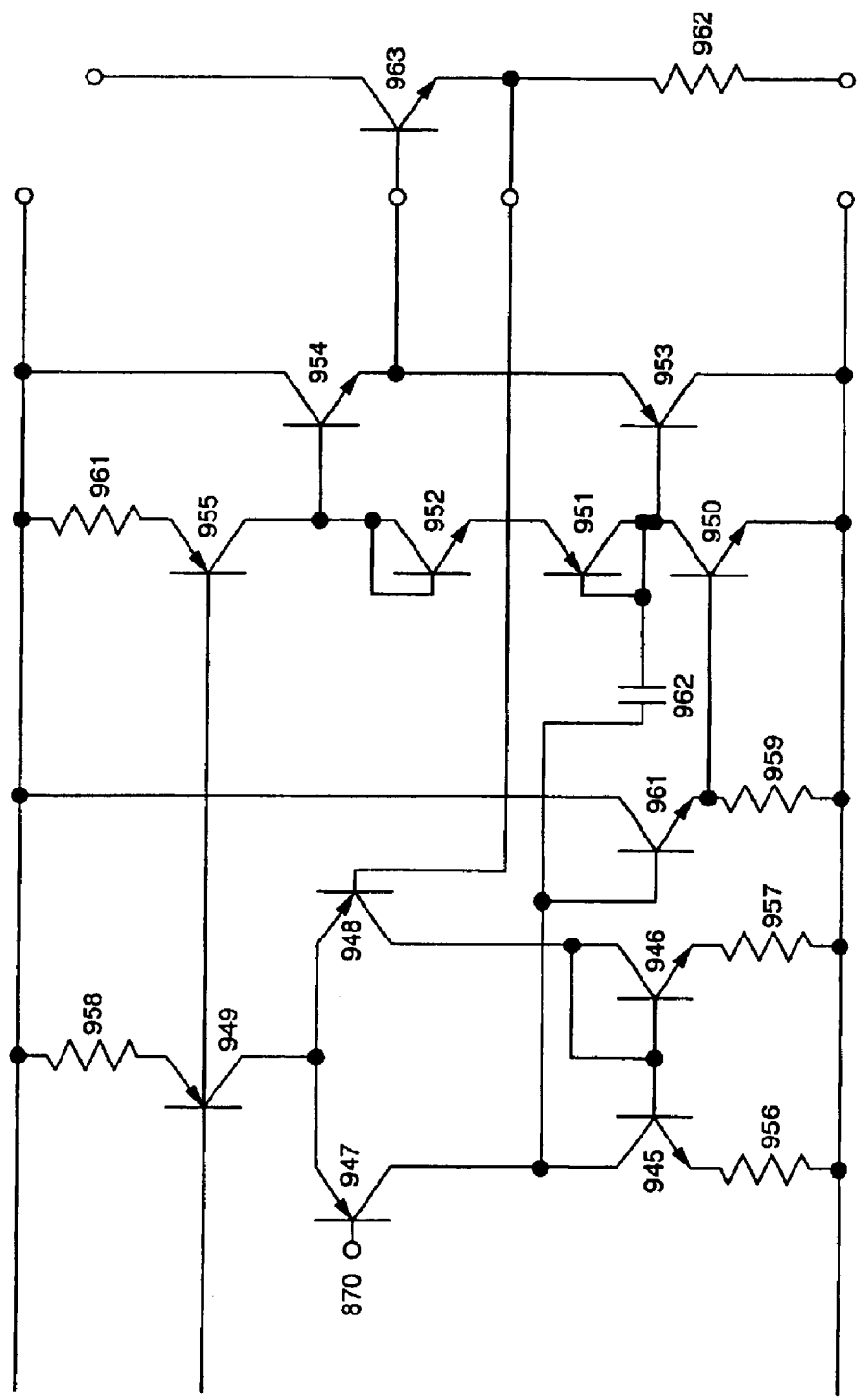
FIG. 19 is a diagram showing an operational amplifier.

The configuration of the operational amplifier 4–6 is explained by using FIG. 19. The operational amplifier 4–6 has transistors 945–955, 960, resistances 956–959, 961, 962 and a capacitance 962. The input terminal is supplied with a signal from the band-gap circuit 870. The signal at the output terminal is provided to the interconnection (current supply line) for supplying a current to the anode of the light-emitting element of each color.

Figure 20:
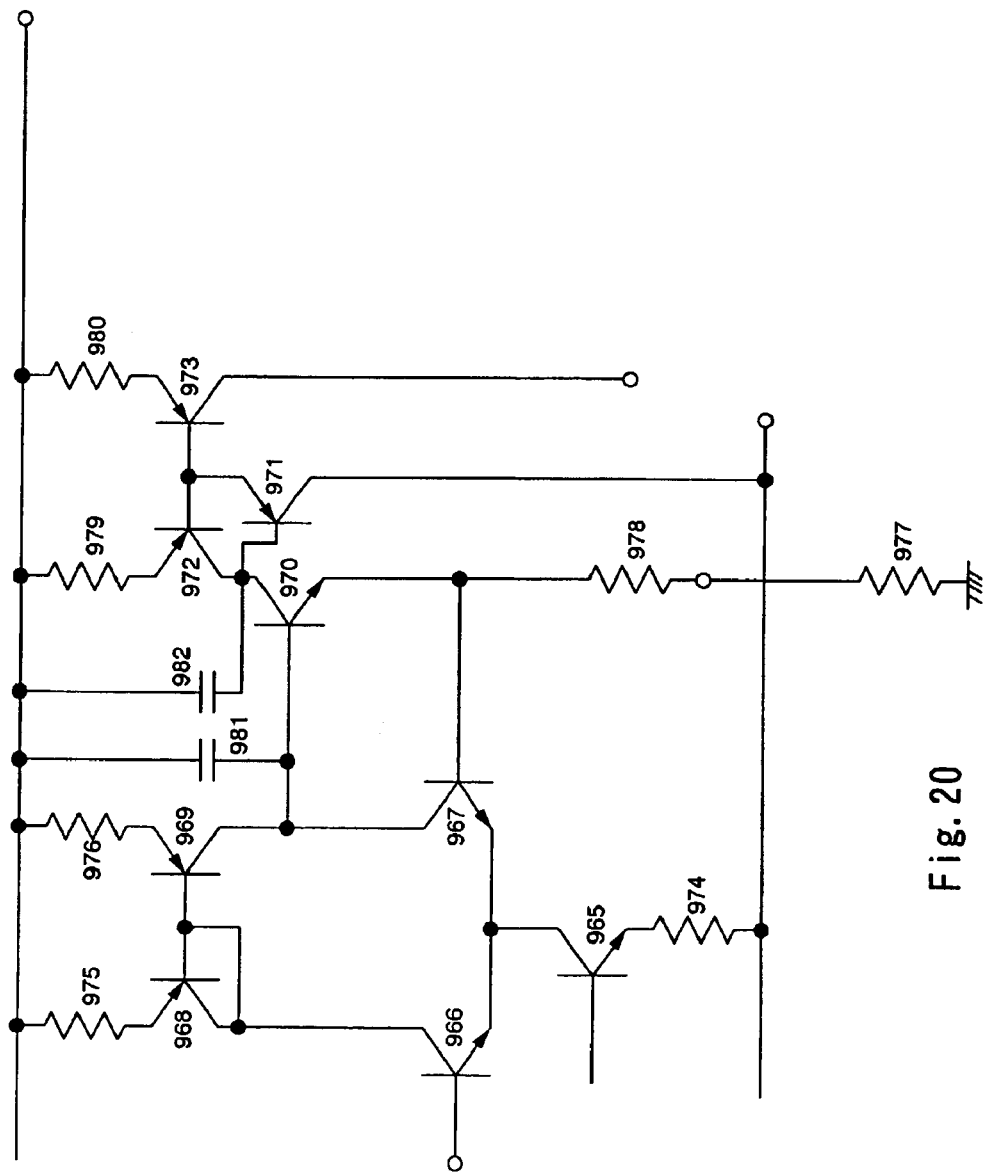
FIG. 20 is diagram showing a current source.

The configuration of the current source 873 is explained by using FIG. 20. The current source 873 has transistors 965–973, resistances 974–980, and capacitance elements 981, 982. To the input terminal is supplied with a signal from the band-gap circuit 870.

The power circuit 802 and controller 801 configured as above is mounted on the panel 800. Thus, completed is a module of an embodiment of the invention.

EXAMPLE

Example 1

This embodiment describes a result of the measurement of luminance deterioration, conducted under direct-current drive (with applying a bias in the forward direction at all times) and alternate-current drive (with applying a forward bias and a reverse bias alternately with a constant period), on a spontaneous light-emitting device that a polymer compound is applied as an organic compound layer and further a buffer layer of a conductive polymer compound is provided between the anode and the light-emitting layer.

Figure 21A:
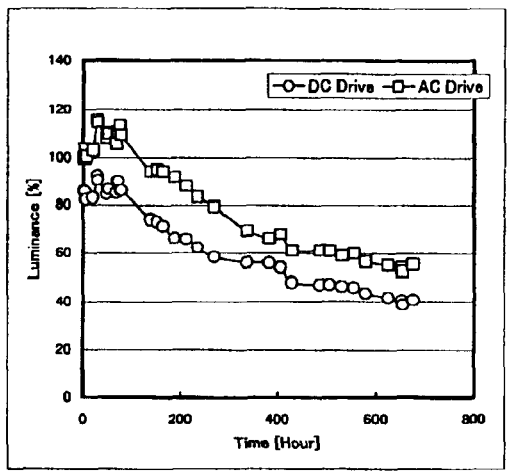
FIGS. 21A to 21D are diagrams showing a relationship between a light-emitting-element luminance and time.
Figure 21B:
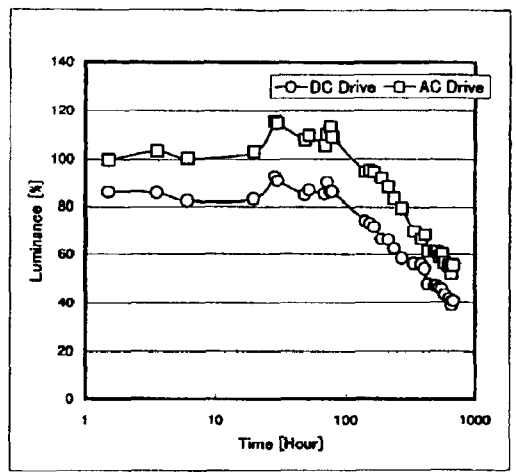

FIGS. 21A and 21B show a result of a reliability test conducted under alternate-current drive at a forward bias: 3.7 V, a reverse bias: 1.7 V, a duty ratio 50% and an alternating-current frequency 60 Hz. The initial luminance was approximately 400 cd/cm$^2$. For comparison, shown together is a result of a reliability test conducted under direct-current drive (forward bias: 3.65 V). As a result, the luminance under the direct-current drive was halved to approximately 400 hours whereas the luminance under the alternating-current drive did not reach a halving even after a lapse of 700 hours.

Figure 21C:
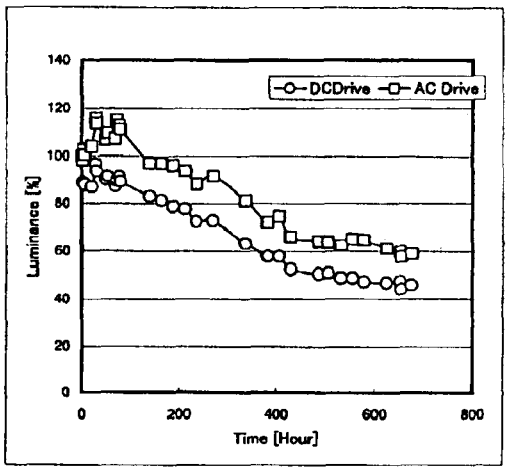
Figure 21D:
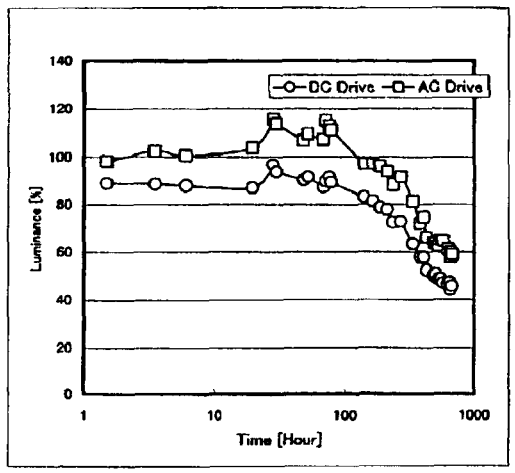

FIGS. 21C and 21D show a result of a reliability test conducted under alternate-current drive at a forward bias: 3.8 V, a reverse bias: 1.7 V, a duty ratio 50% and an alternating-current frequency 600 Hz. The initial luminance was approximately 300 cd/cm$^2$. For comparison, shown together is a result of a reliability test conducted under direct-current drive (forward-bias: 3.65 V). As a result, the luminance under the direct-current drive was halved in approximately 500 hours whereas the initial luminance was held approximately 60% even after a lapse of 700 hours.

From the above results, it can be seen that the spontaneous light-emitting device having undergone alternate current drive is higher in reliability than the spontaneous light-emitting device having undergone direct current drive.

The present invention can provide a light-emitting device using a fact that, by applying a drive voltage in reverse polarity to that in light emission to light-emitting elements for each constant time period, the light-emitting elements can be improved in current-voltage characteristic deterioration. Furthermore, the invention can provide a light-emitting device that is made not dependent upon transistor characteristic by controlling the amount of a current flowing through the light-emitting elements.

Meanwhile, a light-emitting device improved in current-voltage characteristic deterioration can be provided by applying a reverse bias to light-emitting elements without exerting affection upon gray scale representation.

What is claimed is:

1. A light-emitting device comprising:
    a light-emitting element having first and second electrodes;
    a current source including at least one transistor and a capacitance element;
    drive means for supplying a signal current supplied from the current source to the light-emitting element according to an inputted video signal; and
    setting means for applying a reverse bias to the light-emitting element while maintaining potentials on the first and second electrodes.

2. A light-emitting device according to claim 1, wherein the drive means and the setting means are transistors or diodes.

3. A light-emitting device comprising:
    a light-emitting element having first and second electrodes;
    a current source including at least one transistor and a capacitance element;

first setting means for setting a plurality of sub-frame periods within a unit frame period corresponding to a synchronization timing of an inputted video signal;

capacitance means for holding the video signal;

drive means for supplying a signal current supplied from the current source to the light-emitting element;

erasing means for placing potentials on both electrodes of the capacitance means to a same potential thereby ceasing light emission of the light-emitting element; and second setting means for applying a reverse bias to the light-emitting element while maintaining potentials on the first and second electrodes.

4. A light-emitting device according to claim 3, wherein the first setting means, the drive means, the erasing means and the second setting means are transistors or diodes.

5. A method for driving a light emitting device comprising the steps of:

supplying a signal current supplied from a current source to a light-emitting element which has first and second electrodes according to an inputted video signal;

holding the video signal in a capacitor;

placing potentials on both electrodes of the capacitor to a same potential to cease light emission of the light-emitting element; and applying a reverse bias to the light-emitting element while maintaining potentials on the first and second electrodes.

6. A method for driving a light emitting device comprising the steps of:

setting a plurality of sub-frame periods within a unit frame period corresponding to a synchronization timing of an inputted video signal;

supplying a signal current supplied from a current source to a light-emitting element which has first and second electrodes; and applying a reverse bias to the light-emitting element while maintaining potentials on the first and second electrodes.

7. A light-emitting device comprising:

a light-emitting element having first and second electrodes;

a current source including at least one transistor and a capacitance element;

means for supplying a signal current supplied from the current source to the light-emitting element according to an inputted video signal; and means for applying a reverse bias to the light-emitting element while maintaining potentials on the first and second electrodes.

8. A light-emitting device comprising:

a light-emitting element having first and second electrodes;

a current source including at least one transistor and a capacitance element;

means for setting a plurality of sub-frame periods within a unit frame period corresponding to a synchronization timing of an inputted video signal;

capacitance means for holding the video signal;

means for supplying a signal current supplied from the current source to the light-emitting element;

means for placing potentials on both electrodes of the capacitance means to a same potential thereby ceasing light emission of the light-emitting element; and means for applying a reverse bias to the light-emitting element while maintaining potentials on the first and second electrodes.

9. A light emitting device according to claim 1, wherein the light emitting device is incorporated into an electronic appliance selected from the group consisting of a video camera, a digital camera, a goggle type display, a navigation system, an audio reproducing device, a notebook personal computer, a game machine, a mobile information terminal and an image reproducing device.

10. A light emitting device according to claim 3, wherein the light emitting device is incorporated into an electronic appliance selected from the group consisting of a video camera, a digital camera, a goggle type display, a navigation system, an audio reproducing device, a notebook personal computer, a game machine, a mobile information terminal and an image reproducing device.

11. A method according to claim 5, wherein the light emitting device is incorporated into an electronic appliance selected from the group consisting of a video camera, a digital camera, a goggle type display, a navigation system, an audio reproducing device, a notebook personal computer, a game machine, a mobile information terminal and an image reproducing device.

12. A method according to claim 6, wherein the light emitting device is incorporated into an electronic appliance selected from the group consisting of a video camera, a digital camera, a goggle type display, a navigation system, an audio reproducing device, a notebook personal computer, a game machine, a mobile information terminal and an image reproducing device.

13. A light emitting device according to claim 7, wherein the light emitting device is incorporated into an electronic appliance selected from the group consisting of a video camera, a digital camera, a goggle type display, a navigation system, an audio reproducing device, a notebook personal computer, a game machine, a mobile information terminal and an image reproducing device.

14. A light emitting device according to claim 8, wherein the light emitting device is incorporated into an electronic appliance selected from the group consisting of a video camera, a digital camera, a goggle type display, a navigation system, an audio reproducing device, a notebook personal computer, a game machine, a mobile information terminal and an image reproducing device.

* * * * *